US010291923B2

(12) United States Patent
Hendry et al.

(10) Patent No.: US 10,291,923 B2
(45) Date of Patent: May 14, 2019

(54) MAPPING OF TILE GROUPING AND SAMPLES IN HEVC AND L-HEVC FILE FORMATS

(71) Applicant: QUALCOMM Incorporated, San Diego, CA (US)

(72) Inventors: Fnu Hendry, San Diego, CA (US); Ye-Kui Wang, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 20 days.

(21) Appl. No.: 15/602,664

(22) Filed: May 23, 2017

(65) Prior Publication Data

US 2017/0347109 A1 Nov. 30, 2017

Related U.S. Application Data

(60) Provisional application No. 62/341,025, filed on May 24, 2016.

(51) Int. Cl.
*H04N 19/70* (2014.01)
*H04N 19/119* (2014.01)
*H04N 19/169* (2014.01)
*H04N 19/174* (2014.01)
*H04N 19/96* (2014.01)

(52) U.S. Cl.
CPC ......... *H04N 19/188* (2014.11); *H04N 19/119* (2014.11); *H04N 19/174* (2014.11); *H04N 19/70* (2014.11); *H04N 19/96* (2014.11)

(58) Field of Classification Search
CPC .. H04N 19/188; H04N 19/119; H04N 19/174; H04N 19/70; H04N 19/96
See application file for complete search history.

(56) References Cited

U.S. PATENT DOCUMENTS 9,621,905 B2 * 4/2017 Coban ............... H04N 19/70
9,819,947 B2 * 11/2017 Ye .................... H04N 19/196
10,034,010 B2 * 7/2018 Hendry ............. H04N 19/187
(Continued)

OTHER PUBLICATIONS

International Preliminary Report on Patentability from International Application No. PCT/US2017/034185, dated May 16, 2018, 28 pp.
(Continued)

*Primary Examiner* — Jayanti K Patel
*Assistant Examiner* — Irfan Habib
(74) *Attorney, Agent, or Firm* — Shumaker & Sieffert, P.A.

(57) ABSTRACT

A computing device receive a bitstream comprising a plurality of coded slice NAL units encapsulating RBSPs for respective slice segments of a slice of a picture. The slice segments including an independent slice segment and one or more dependent slice segments. The picture is partitioned into a plurality of tiles, including a first tile and a second tile. The slice segments include one or more slice segments that contain CTUs of the first tile and one or more slice segments that contain CTUs of the second tile. The computing device generates a file storing the bitstream. As part of generating the file, the computing device defines a tile region in the file. The tile region comprises an integer number of tiles forming a rectangular region encoded in one or more of the slice segments. The rectangular tile region includes the first tile and not the second tile.

28 Claims, 8 Drawing Sheets

(56) References Cited

U.S. PATENT DOCUMENTS

| | | | |
|---|---|---|---|
| 2007/0116131 A1* | 5/2007 | Sun | G06T 3/4007 375/240.29 |
| 2007/0140354 A1* | 6/2007 | Sun | H04N 19/29 375/240.24 |
| 2008/0089597 A1* | 4/2008 | Guo | H04N 19/30 382/238 |
| 2009/0310674 A1* | 12/2009 | Le Leannec | H04N 19/33 375/240.12 |
| 2010/0153574 A1* | 6/2010 | Lee | H04L 12/1827 709/231 |
| 2010/0225655 A1* | 9/2010 | Tung | G06T 1/20 345/522 |
| 2011/0243219 A1* | 10/2011 | Hong | H04N 19/176 375/240.02 |
| 2012/0114034 A1* | 5/2012 | Huang | H04N 19/70 375/240.03 |
| 2012/0269267 A1* | 10/2012 | Choi | H04N 19/597 375/240.13 |
| 2013/0148739 A1* | 6/2013 | Lee | H04N 19/44 375/240.18 |
| 2013/0208808 A1* | 8/2013 | Sasai | H04N 19/117 375/240.25 |
| 2014/0086330 A1* | 3/2014 | Zhou | H04N 19/119 375/240.24 |
| 2014/0341549 A1* | 11/2014 | Hattori | H04N 19/70 386/354 |
| 2015/0023406 A1* | 1/2015 | Lee | H04N 19/46 375/240.02 |
| 2015/0023434 A1* | 1/2015 | Schierl | H04N 19/70 375/240.26 |
| 2015/0201206 A1* | 7/2015 | Leontaris | H04N 19/597 375/240.25 |
| 2015/0373333 A1* | 12/2015 | Wang | H04N 19/59 375/240.25 |
| 2015/0381999 A1* | 12/2015 | Chuang | H04N 19/503 375/240.16 |
| 2016/0227234 A1* | 8/2016 | Han | H04N 19/52 |
| 2016/0330459 A1* | 11/2016 | Choi | H04N 19/597 |
| 2017/0201757 A1* | 7/2017 | Goldman | H04N 19/46 |
| 2017/0339415 A1 | 11/2017 | Wang et al. | |
| 2017/0347109 A1* | 11/2017 | Hendry | H04N 19/70 |

OTHER PUBLICATIONS

International Search Report and Written Opinion of International Application No. PCT/US2017/034185, dated Jul. 28, 2017, 13 pp.
ITU-T H.265, Series H: Audiovisual and Multimedia Systems, Infrastructure of audiovisual services—Coding of moving video, Advanced video coding for generic audiovisual services, The International Telecommunication Union. Apr. 2015, 634 pp.
Wang et al., "High Efficiency Video Coding (HEVC) Defect Report," Joint Collaborative Team on Video Coding (JCT-VC) of ITU-T SG 16 WP 3 and ISO/IEC JTC 1/SC 291WG 11, Jul. 25-Aug. 2, 2013, Document: JCTVC-N1003_v1, Sep. 27, 2013, 311 pp.
Chen et al., "High Efficiency Video Coding (HEVC) Scalable Extension Draft 3", Jul. 25-Aug. 2, 2013, Joint Collaborative Team on Video Coding (JCT-VC) of ITU-T SG 16 WP 3 and ISO/IEC JTC 1/SC 291WG 11, Doc. JCTVC-N1008_v3, Sep. 16, 2013; 14th Meeting, Vienna, AT, 68 pp.
Tech, et al., "MV-H EVC Draft Text 5", Jul. 27.-Aug. 2, 2013; Joint Collaborative Team on 3D Video Coding Extension Development of ITU-T SG 16 WP 3 and ISO/IEC JTC 1/SC 291WG 11, Doc: JCT3V-E1004-v6, 5th Meeting: Vienna, AT, Aug. 7, 2013, 65 pp.
Flynn, et al., "High Efficiency Video Coding (HEVC) Range Extensions Text Specification: Draft 4", Apr. 18-26, 2013Joint Collaborative Team on Video Coding (JCT-VC) of ITU-T SG 16 WP 3 and ISO/IEC JTC 1/SC 29/WG 11, Doc. JCTVC-N1005_v3, 13th Meeting: Incheon, KR, Aug. 8, 2013, 332 pp.
Tech et al., "3D-HEVC Draft Text 1," Joint Collaborative Team on 3D Video Coding Extension Development of ITU-T SG 16 WP 3 and ISO/IEC JTC 1/SC 29/WG 11, Jul. 27-Aug. 2, 2013, Document: JCT3V-E1001-v3, Sep. 11, 2013, 89 pp.
International Standard ISO/IEC 14496-12, Information Technology—Coding of audio-visual objects—Part 12: ISO base media file format, Third Edition, Oct. 15, 2008, 120 pp.
"Part 15: Carriage of network abstraction layer (NAL) unit structured video in ISO base media file format," Information technology—Coding of audio visual objects, ISO/IEC 14496-15, Jul. 1, 2014, 124 pp.
3GPP TS 26.244 V12.2.0, 3rd Generation Partnership Project; Technical Specification Group Services and System Aspects; Transparent end-to-end packet switched streaming service (PSS); 3GPP file format (3GP), (Release 12), Dec. 2013, 61 pp.
ITU-T H.223, Series H: Audiovisual and Multimedia Systems, Infrastructure of Audiovisual Services—Transmission Multiplexing and Synchronization, Multiplexing Protocol for Low Bit Rate Multimedia Communication, The International Telecommunication Union, Jul. 2001, 74 pp.
"International Standard ISO/IEC 14496-14, Information Technology—Coding of audio-visual objects—Part 14: MP4 file format," First Edition, Nov. 15, 2003, 18 pp.
"Information technology—Coding of audio-visual objects—Part 15: Carnage of network abstraction layer (NAL) unit structured video in the ISO base media file format," ISO/IEC FDIS 1496-15:2014, Jan. 13, 2014, 179 pp.
Response to Written Opinion dated Jul. 28, 2017 from International Application No. PCT/US2017/034185, filed on Oct. 17, 2017, 6 pp.
Hendry, et al., "Comments on storage of tiled video in ISO/IEC 14496-15," ISO/IEC JTC1/SC29/WG11 MPEG2016/M38225r2, May 29 2016, 7 pp.
"Information technology—Coding of audio-visual objects—Part 15: Carriage of network abstraction layer (NAL) unit structured video in the ISO base media file format," ISO/IEC JTC SC 29/ WG 11, Jan. 13, 2014, 187 pp.

* cited by examiner

US 10,291,923 B2

MAPPING OF TILE GROUPING AND SAMPLES IN HEVC AND L-HEVC FILE FORMATS

This application claims the benefit of U.S. Provisional Patent Application 62/341,025, filed May 24, 2016, the entire content of which is incorporated herein by reference.

TECHNICAL FIELD

This disclosure relates to computing devices for processing video data.

BACKGROUND

Digital video capabilities can be incorporated into a wide range of devices, including digital televisions, digital direct broadcast systems, wireless broadcast systems, personal digital assistants (PDAs), laptop or desktop computers, tablet computers, e-book readers, digital cameras, digital recording devices, digital media players, video gaming devices, video game consoles, cellular or satellite radio telephones, so-called "smart phones," video teleconferencing devices, video streaming devices, and the like. Digital video devices implement video compression techniques, such as those described in the standards defined by ITU-T H.261, ISO/IEC MPEG-1 Visual, ITU-T H.262 or ISO/IEC MPEG-2 Visual, ITU-T H.263, ISO/IEC MPEG-4 Visual ITU-T H.264 or ISO/IEC MPEG-4 AVC, including its Scalable Video Coding (SVC) and Multiview Video Coding (MVC) extensions, and High-Efficiency Video Coding (HEVC), also known as ITU-T H.265 and ISO/IEC 23008-2, including its scalable coding extension (i.e., scalable high-efficiency video coding, SHVC) and multiview extension (i.e., multiview high efficiency video coding, MV-HEVC). HEVC and layered HEVC ("L-HEVC" or "L-HEVC) also describe Various file formats for storage of HEVC and L-HEVC are being developed. The video devices may transmit, receive, encode, decode, and/or store digital video information more efficiently by implementing such video compression techniques.

Video compression techniques perform spatial (intra-picture) prediction and/or temporal (inter-picture) prediction to reduce or remove redundancy inherent in video sequences. For block-based video coding, a video slice (i.e., a video frame or a portion of a video frame) may be partitioned into video blocks, which may also be referred to as treeblocks, coding units (CUs) and/or coding nodes. Pictures may be referred to as frames, and reference pictures may be referred to as reference frames.

SUMMARY

Aspects of this disclosure generally relate to improvements to computing devices that handle tile grouping in HEVC and layered HEVC (L-HEVC) file formats. A computing device, such as video coding device (e.g., an HEVC-compliant encoder or decoder, a file generation device, a media aware network element (MANE), or other type of computing device may implement various techniques of this disclosure either independently or in various combinations.

In one example, this disclosure describes a method of processing video data, the method comprising: receiving, by a computing device, a bitstream comprising a stream of Network Abstraction Layer (NAL) units, the stream of NAL units comprising a plurality of coded slice NAL units, each respective coded slice NAL unit of the plurality of coded slice NAL units encapsulating a respective Raw Byte Sequence Payload (RBSP) for a respective slice segment of a plurality of slice segments of a slice of a picture of the video data, each respective slice segment of the plurality of slice segments of the slice comprising an integer number of Coding Tree Units (CTUs) of the picture, the plurality of slice segments of the slice including an independent slice segment and one or more dependent slice segments, wherein: no values of syntax elements in a slice segment header of the independent slice segment are inferable from values for any preceding slice segment, for each respective dependent slice segment of the one or more dependent slice segments, the respective dependent slice segment has values of one or more syntax elements of a slice segment header of the respective dependent slice segment inferable from values for the independent slice segment, the picture is partitioned into a plurality of tiles, the plurality of tiles including a first tile and a second tile, and the plurality of slice segments of the slice includes one or more slice segments that contain CTUs of the first tile and the plurality of slice segments of the slice includes one or more slice segments that contain CTUs of the second tile; and generating, by the computing device, a file storing the bitstream, wherein generating the file comprises defining a tile region in the file, the tile region being a rectangular tile region that comprises an integer number of tiles of the plurality of tiles forming a rectangular region encoded in one or more of the slice segments, the rectangular tile region including the first tile, the rectangular tile region not including the second tile.

In another example, this disclosure describes a method of processing video data, the method comprising: receiving, by a computing device, a file that stores a bitstream, the bitstream comprising a stream of Network Abstraction Layer (NAL) units, the stream of NAL units comprising a plurality of coded slice NAL units, each respective coded slice NAL unit of the plurality of coded slice NAL units encapsulating a respective Raw Byte Sequence Payload (RBSP) for a respective slice segment of a plurality of slice segments of a slice of a picture of the video data, each respective slice segment of the plurality of slice segments of the slice comprising an integer number of Coding Tree Units (CTUs) of the picture, the plurality of slice segments of the slice including an independent slice segment and one or more dependent slice segments, wherein: no values of syntax elements in a slice segment header of the independent slice segment are inferable from values for any preceding slice segment, for each respective dependent slice segment of the one or more dependent slice segments, the respective dependent slice segment has values of one or more syntax elements of a slice segment header of the respective dependent slice segment inferable from values for the independent slice segment, the picture is partitioned into a plurality of tiles, the plurality of tiles including a first tile and a second tile, and the plurality of slice segments of the slice includes one or more slice segments that contain CTUs of the first tile and the plurality of slice segments of the slice includes one or more slice segments that contain CTUs of the second tile, and a tile region is defined in the file, the tile region being a rectangular tile region that comprises an integer number of tiles of the plurality of tiles forming a rectangular region encoded in one or more of the slice segments, the rectangular tile region including the first tile, the rectangular tile region not including the second tile; and using, by the computing device, the file for at least one of: local media file playback or progressive downloading of data in the file to a remote device.

In another example, this disclosure describes a computing device for generating a file for storage of video data, the computing device comprising: a memory configured to store the file; and one or more processors configured to: receive a bitstream comprising a stream of Network Abstraction Layer (NAL) units, the stream of NAL units comprising a plurality of coded slice NAL units, each respective coded slice NAL unit of the plurality of coded slice NAL units encapsulating a respective Raw Byte Sequence Payload (RBSP) for a respective slice segment of a plurality of slice segments of a slice of a picture of the video data, each respective slice segment of the plurality of slice segments of the slice comprising an integer number of Coding Tree Units (CTUs) of the picture, the plurality of slice segments of the slice including an independent slice segment and one or more dependent slice segments, wherein: no values of syntax elements in a slice segment header of the independent slice segment are inferable from values for any preceding slice segment, for each respective dependent slice segment of the one or more dependent slice segments, the respective dependent slice segment has values of one or more syntax elements of a slice segment header of the respective dependent slice segment inferable from values for the independent slice segment, the picture is partitioned into a plurality of tiles, the plurality of tiles including a first tile and a second tile, and the plurality of slice segments of the slice includes one or more slice segments that contain CTUs of the first tile and the plurality of slice segments of the slice includes one or more slice segments that contain CTUs of the second tile; and generate a file storing the bitstream, wherein generating the file comprises defining a tile region in the file, the tile region being a rectangular tile region that comprises an integer number of tiles of the plurality of tiles forming a rectangular region encoded in one or more of the slice segments, the rectangular tile region including the first tile, the rectangular tile region not including the second tile.

In another example, this disclosure describes a computing device for processing a file for storage of video data, the computing device comprising: a memory configured to store the file; and one or more processors configured to: receive a file that stores a bitstream, the bitstream comprising a stream of Network Abstraction Layer (NAL) units, the stream of NAL units comprising a plurality of coded slice NAL units, each respective coded slice NAL unit of the plurality of coded slice NAL units encapsulating a respective Raw Byte Sequence Payload (RBSP) for a respective slice segment of a plurality of slice segments of a slice of a picture of the video data, each respective slice segment of the plurality of slice segments of the slice comprising an integer number of Coding Tree Units (CTUs) of the picture, the plurality of slice segments of the slice including an independent slice segment and one or more dependent slice segments, wherein: no values of syntax elements in a slice segment header of the independent slice segment are inferable from values for any preceding slice segment, for each respective dependent slice segment of the one or more dependent slice segments, the respective dependent slice segment has values of one or more syntax elements of a slice segment header of the respective dependent slice segment inferable from values for the independent slice segment, the picture is partitioned into a plurality of tiles, the plurality of tiles including a first tile and a second tile, and the plurality of slice segments of the slice includes one or more slice segments that contain CTUs of the first tile and the plurality of slice segments of the slice includes one or more slice segments that contain CTUs of the second tile, a tile region is defined in the file, the tile region being a rectangular tile region that comprises an integer number of tiles of the plurality of tiles forming a rectangular region encoded in one or more of the slice segments, the rectangular tile region including the first tile, the rectangular tile region not including the second tile; and use the file for at least one of: local media file playback or progressive downloading of data in the file to a remote device.

In another example, this disclosure describes an apparatus for generating a file for storage of video data, the apparatus comprising: means for receiving a bitstream comprising a stream of Network Abstraction Layer (NAL) units, the stream of NAL units comprising a plurality of coded slice NAL units, each respective coded slice NAL unit of the plurality of coded slice NAL units encapsulating a respective Raw Byte Sequence Payload (RBSP) for a respective slice segment of a plurality of slice segments of a slice of a picture of the video data, each respective slice segment of the plurality of slice segments of the slice comprising an integer number of Coding Tree Units (CTUs) of the picture, the plurality of slice segments of the slice including an independent slice segment and one or more dependent slice segments, wherein: no values of syntax elements in a slice segment header of the independent slice segment are inferable from values for any preceding slice segment, for each respective dependent slice segment of the one or more dependent slice segments, the respective dependent slice segment has values of one or more syntax elements of a slice segment header of the respective dependent slice segment inferable from values for the independent slice segment, the picture is partitioned into a plurality of tiles, the plurality of tiles including a first tile and a second tile, and the plurality of slice segments of the slice includes one or more slice segments that contain CTUs of the first tile and the plurality of slice segments of the slice includes one or more slice segments that contain CTUs of the second tile; and means for generating a file storing the bitstream, wherein generating the file comprises defining a tile region in the file, the tile region being a rectangular tile region that comprises an integer number of tiles of the plurality of tiles forming a rectangular region encoded in one or more of the slice segments, the rectangular tile region including the first tile, the rectangular tile region not including the second tile.

In another example, this disclosure describes an apparatus for processing a file for storage of video data, the apparatus comprising: means for receiving a file that stores a bitstream, the bitstream comprising a stream of Network Abstraction Layer (NAL) units, the stream of NAL units comprising a plurality of coded slice NAL units, each respective coded slice NAL unit of the plurality of coded slice NAL units encapsulating a respective Raw Byte Sequence Payload (RBSP) for a respective slice segment of a plurality of slice segments of a slice of a picture of the video data, each respective slice segment of the plurality of slice segments of the slice comprising an integer number of Coding Tree Units (CTUs) of the picture, the plurality of slice segments of the slice including an independent slice segment and one or more dependent slice segments, wherein: no values of syntax elements in a slice segment header of the independent slice segment are inferable from values for any preceding slice segment, for each respective dependent slice segment of the one or more dependent slice segments, the respective dependent slice segment has values of one or more syntax elements of a slice segment header of the respective dependent slice segment inferable from values for the independent slice segment, the picture is partitioned into a plurality of tiles, the plurality of tiles including a first tile and a second tile, and the plurality of slice segments of the slice includes one or more slice segments that contain CTUs of the first tile and the plurality of slice segments of the slice includes one or more slice segments that contain CTUs of the second tile, and a tile region is defined in the file, the tile region being a rectangular tile region that comprises an integer number of tiles of the plurality of tiles forming a rectangular region encoded in one or more of the slice segments, the rectangular tile region including the first tile, the rectangular tile region not including the second tile; and means for using the file for at least one of: local media file playback or progressive downloading of data in the file to a remote device.

In another example, this disclosure describes a computer-readable storage medium encoded with instructions that, when executed, configure a processor of a device to: receive a bitstream comprising a stream of Network Abstraction Layer (NAL) units, the stream of NAL units comprising a plurality of coded slice NAL units, each respective coded slice NAL unit of the plurality of coded slice NAL units encapsulating a respective Raw Byte Sequence Payload (RBSP) for a respective slice segment of a plurality of slice segments of a slice of a picture of the video data, each respective slice segment of the plurality of slice segments of the slice comprising an integer number of Coding Tree Units (CTUs) of the picture, the plurality of slice segments of the slice including an independent slice segment and one or more dependent slice segments, wherein: no values of syntax elements in a slice segment header of the independent slice segment are inferable from values for any preceding slice segment, for each respective dependent slice segment of the one or more dependent slice segments, the respective dependent slice segment has values of one or more syntax elements of a slice segment header of the respective dependent slice segment inferable from values for the independent slice segment, the picture is partitioned into a plurality of tiles, the plurality of tiles including a first tile and a second tile, and the plurality of slice segments of the slice includes one or more slice segments that contain CTUs of the first tile and the plurality of slice segments of the slice includes one or more slice segments that contain CTUs of the second tile; and generate a file storing the bitstream, wherein generating the file comprises defining a tile region in the file, the tile region being a rectangular tile region that comprises an integer number of tiles of the plurality of tiles forming a rectangular region encoded in one or more of the slice segments, the rectangular tile region including the first tile, the rectangular tile region not including the second tile.

In another example, this disclosure describes a computer-readable storage medium encoded with instructions that, when executed, configure a processor of a device to: receive a file that stores a bitstream, the bitstream comprising a stream of Network Abstraction Layer (NAL) units, the stream of NAL units comprising a plurality of coded slice NAL units, each respective coded slice NAL unit of the plurality of coded slice NAL units encapsulating a respective Raw Byte Sequence Payload (RBSP) for a respective slice segment of a plurality of slice segments of a slice of a picture of the video data, each respective slice segment of the plurality of slice segments of the slice comprising an integer number of Coding Tree Units (CTUs) of the picture, the plurality of slice segments of the slice including an independent slice segment and one or more dependent slice segments, wherein: no values of syntax elements in a slice segment header of the independent slice segment are inferable from values for any preceding slice segment, for each respective dependent slice segment of the one or more dependent slice segments, the respective dependent slice segment has values of one or more syntax elements of a slice segment header of the respective dependent slice segment inferable from values for the independent slice segment, the picture is partitioned into a plurality of tiles, the plurality of tiles including a first tile and a second tile, and the plurality of slice segments of the slice includes one or more slice segments that contain CTUs of the first tile and the plurality of slice segments of the slice includes one or more slice segments that contain CTUs of the second tile, and a tile region is defined in the file, the tile region being a rectangular tile region that comprises an integer number of tiles of the plurality of tiles forming a rectangular region encoded in one or more of the slice segments, the rectangular tile region including the first tile, the rectangular tile region not including the second tile; and use the file for at least one of: local media file playback or progressive downloading of data in the file to a remote device.

The details of one or more examples of the disclosure are set forth in the accompanying drawings and the description below. Other features, objects, and advantages will be apparent from the description, drawings, and claims.

DETAILED DESCRIPTION

Figure 1:
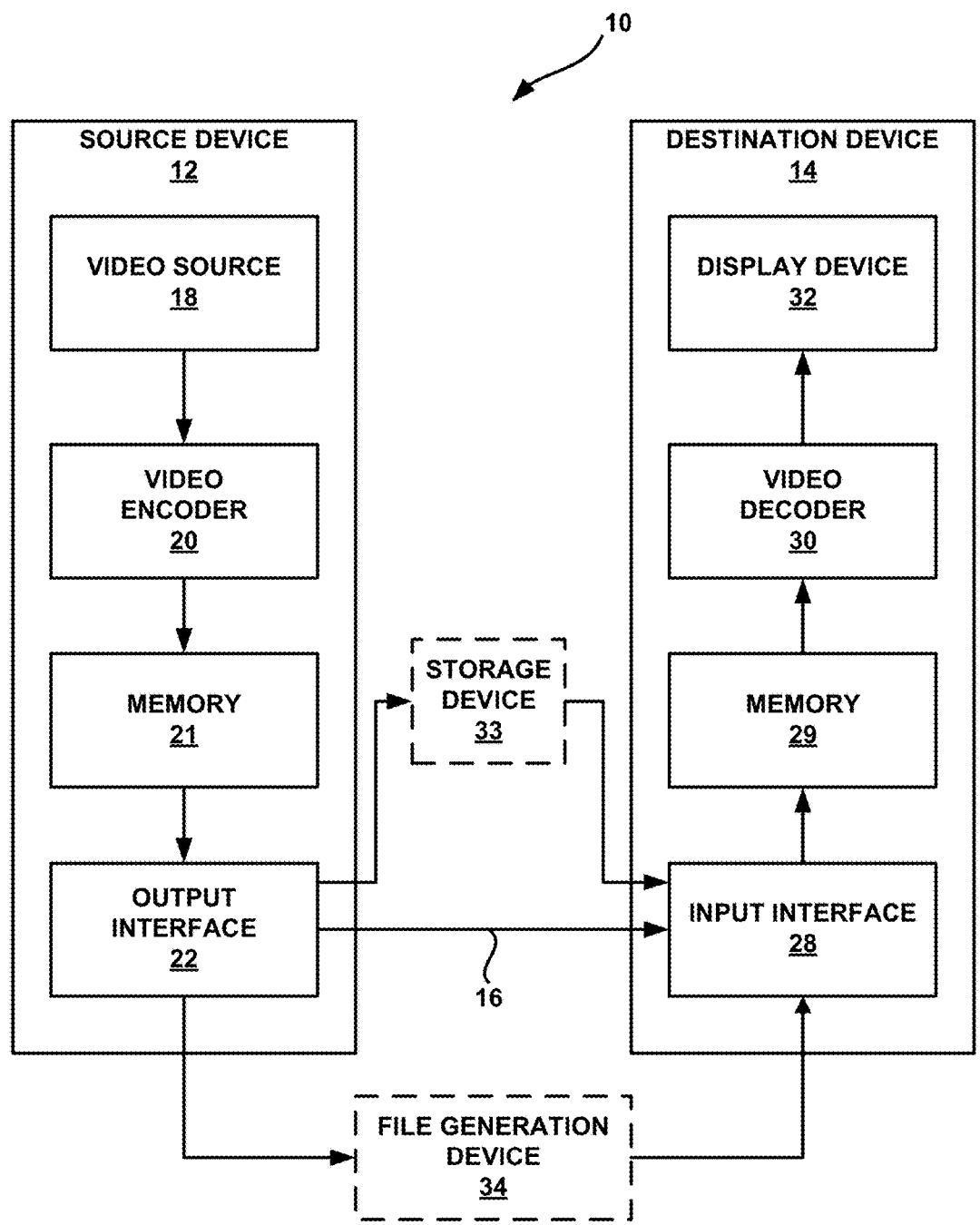
FIG. 1 is a block diagram illustrating an example video encoding and decoding system that may use the techniques described in this disclosure.

In High Efficiency Video Coding (HEVC) and other video coding standards, pictures are divided into slices and tiles. A slice is an integer number of coding tree units (CTUs) contained in one independent slice segment and all subsequent dependent slice segments (if any) that precede the next independent slice segment (if any) within the same access unit. A coding tree unit (CTU) of a picture may comprise one or more CTBs and may comprise syntax structures used to encode the samples of the one or more coding tree blocks (CTBs). A CTB may be an N×N block of pixel samples in a sample array of a picture. A slice segment is an integer number of CTUs ordered consecutively in the tile scan and contained in a single Network Abstraction Layer (NAL) unit. An independent slice segment is a slice segment for which the values of the syntax elements of the slice segment header are not inferable from the values for a preceding slice segment. A dependent slice segment is a slice segment for which the values of some syntax elements of the slice segment header are inferable from the values for the preceding independent slice segment in decoding order.

A tile is a rectangular region of CTUs within a particular tile column and a particular tile row in a picture. A tile column is a rectangular region of CTUs having a height equal to a height of the picture and a width signaled in a bitstream, such as in a picture parameter set (PPS) in the bitstream. A tile row is a rectangular region of CTUs having a width equal to a width of the picture and a height signaled in the bitstream, such as in a PPS. A tile may consist of CTUs contained in more than one slice. Similarly, a slice may consist of CTUs contained in more than one tile. However, one or both of the following conditions shall be fulfilled for each slice and tile: (1) all CTUs in a slice belong to the same tile, and (2) all CTUs in a tile belong to the same slice. Furthermore, one or both of the following conditions shall be fulfilled for each slice segment and tile: (1) all CTUs in a slice segment belong to the same tile, and (2) all CTUs in a tile belong to the same slice segment.

In some examples, the CTUs within one or more tiles of a picture can be decoded without reference to CTUs in other tiles of the picture, but may be dependent on temporal or inter-layer reference pictures. In instances where a video decoder can decode a tile of a picture without reference to other tiles of the picture, the video decoder may decode the CTUs in the tile without accessing encoded CTUs of other tiles of the picture. For example, if the tile corresponds to the upper right quarter of the picture, the video decoder does not need to receive the encoded CTUs of the other three quarters of the picture. This may be useful in a variety of situations. For instance, if a device has a small display screen and the upper right tiles of pictures of a video are of primary interest, it may be desirable to only display the upper right tiles of the pictures. Accordingly, the device may download and decode the encoded CTUs of the upper right tiles of the pictures without downloading or decoding the encoded CTUs of the other tiles of the pictures. Furthermore, this may be especially useful in the context of virtual reality (VR). In the context of VR, a user only views a portion of a 360-degree scene at any given moment. By dividing the 360-degree scene into tiles, a device may download and/or decode only those tiles of the 360-degree scene that the user is currently viewing. There may however be parsing dependencies between tiles in a picture. For example, the CTUs occurring first in decoding order in a particular tile may be in a dependent slice segment. Thus, in this example, it may be necessary to parse a corresponding independent segment containing encoded CTUs of another tile prior to being able to parse the CTUs of the particular tile.

Files conforming to various file formats may be used to store encoded video data. Such file formats include the International Organization for Standardization ("ISO") base media file format (ISOBMFF, ISO/IEC 14496-12), and other standards derived from the ISOBMFF, including MPEG-4 file format (ISO/IEC 14496-15), 3GPP file format (3GPP TS 26.244), and AVC file format (ISO/IEC 14496-15). Files conforming to the ISOBMFF may include metadata in addition to the encoded video data. The metadata may help a computing device locate and extract desired encoded video data within the file without the computing device needing to interpret or decode the encoded video data. In some examples, after locating the desired encoded video data in the file, the computing device may decode the desired encoded video data without needing to decode other encoded video data in the file. In some examples, after locating the desired encoded video data in the file, the computing device may transmit the desired encoded video data to another device without transmitting other encoded video data in the file. For the reasons discussed above, the desired encoded video data may correspond to particular tiles of pictures of the video data.

An extension of the ISOBMFF for carriage of Network Abstraction Layer (NAL) unit structured video (hereinafter, ISO/IEC FDIS 144916-15:2014) specifies mechanisms that enable a computing device to locate encoded video data corresponding to particular tiles. For example, ISO/IEC FDIS 144916-15:2014 defines the concepts of a rectangular tile region and an unconstrained tile region. In ISO/IEC FDIS 144916-15:2014, a rectangular tile region is defined as any integer number of HEVC tiles forming a rectangular region encoded in one or more slices that contain no other HEVC tile and that may but need not be contiguous in decoding order. Furthermore, in ISO/IEC FDIS 144916-15: 2014, an unconstrained tile region is defined as any number of complete slices that consist of one or more complete HEVC tiles and but need not be contiguous in decoding order. A file may include metadata indicating how to locate encoded video data for rectangular tile regions and unconstrained tile regions.

The definitions of rectangular tile regions and unconstrained tile regions in ISO/IEC FDIS 144916-15:2014 have several shortcomings. For example, ISO/IEC FDIS 144916-15:2014 defines rectangular tile regions and unconstrained tile regions in terms of slices. However, because a slice may include CTUs of multiple tiles, the situation may arise that a rectangular tile region or unconstrained tile region may include a slice that includes slice segments containing CTUs of an undesired tile. For example, a picture may have one slice and may be divided into a first tile and a second tile. In this example, a first group of slice segments of the slice may include the CTUs in the first tile and a second group of slice segments of the slice may include the CTUs in the second tile. Furthermore, in this example, it may be desirable to define a rectangular tile region that comprises the first tile, but not the second tile. However, because ISO/IEC FDIS 144916-15:2014 defines rectangular tile regions and unconstrained tile regions in terms of slices instead of slice segments, it is unclear in ISO/IEC FDIS 14416-15:2014 whether a tile region can be defined to include a particular tile if a next tile in decoding order is not in the tile region and does not start with an independent slice segment (i.e., if the particular tile includes CTUs of a slice and the slice includes CTUs in a tile not in the tile region). This lack of clarity may result in computing devices generating errors or the computing devices needing extra complexity to handle the ambiguity. Either the errors or extra complexity may diminish the performance of the computing devices.

As described in greater detail below, techniques of this disclosure define the concepts of rectangular tile regions and unconstrained tile regions at the level of a slice segment instead of a full slice. Accordingly, such techniques may help a computing device avoid errors and extra complexity, thereby potentially improving the computing device.

FIG. 1 is a block diagram illustrating an example video encoding and decoding system 10 that may use the techniques described in this disclosure. As shown in FIG. 1, system 10 includes a source device 12 that generates encoded video data to be decoded at a later time by a destination device 14. Source device 12 and destination device 14 may comprise any of a wide range of devices, including desktop computers, notebook (i.e., laptop) computers, tablet computers, set-top boxes, telephone handsets such as so-called "smart" phones, so-called "smart" pads, televisions, cameras, display devices, digital media players, video gaming consoles, video streaming device, or the like. In some cases, source device 12 and destination device 14 may be equipped for wireless communication. Source device 12 and destination device 14 may be considered video devices.

In the example of FIG. 1, source device 12 includes a video source 18, video encoder 20, memory 21, and an output interface 22. In some cases, output interface 22 may include a modulator/demodulator (modem) and/or a transmitter. In source device 12, video source 18 may include a source such as a video capture device, e.g., a video camera, a video archive containing previously captured video, a video feed interface to receive video from a video content provider, and/or a computer graphics system for generating computer graphics data as the source video, or a combination of such sources. However, the techniques described in this disclosure may be applicable to video coding in general, and may be applied to wireless and/or wired applications. In each case, the captured, pre-captured, or computer-generated video may be encoded by video encoder 20. Memory 21 may be configured to store video data in encoded or non-encoded form. In some examples, memory 21 may store a file for storage of video data.

Video encoder 20 may encode the captured, pre-captured, or computer-generated video. Source device 12 may transmit the encoded video data directly to destination device 14 via output interface 22 of source device 12. The encoded video data may also (or alternatively) be stored onto storage device 33 for later access by destination device 14 or other devices, for decoding and/or playback.

Destination device 14 includes an input interface 28, a memory 29, a video decoder 30, and a display device 32. In some cases, input interface 28 may include a receiver and/or a modem. Input interface 28 of destination device 14 receives the encoded video data over link 16. The encoded video data communicated over link 16, or provided on storage device 33, may include a variety of syntax elements generated by video encoder 20 for use by a video decoder, such as video decoder 30, in decoding the video data. Such syntax elements may be included with the encoded video data transmitted on a communication medium, stored on a storage medium, or stored on a file server. Memory 29 may be configured to store video data, such as encoded video data (e.g., a bitstream) received by input interface 28, decoded video data, a file for storage of video data, and so on.

Display device 32 may be integrated with, or may be external to, destination device 14. In some examples, destination device 14 may include an integrated display device and may also be configured to interface with an external display device. In other examples, destination device 14 may be a display device. In general, display device 32 displays the decoded video data to a user, and may comprise any of a variety of display devices such as a liquid crystal display (LCD), a plasma display, an organic light emitting diode (OLED) display, or another type of display device.

Video encoder 20 and video decoder 30 each may be implemented as any of a variety of suitable encoder circuitry, such as one or more microprocessors, digital signal processors (DSPs), application specific integrated circuits (ASICs), field programmable gate arrays (FPGAs), discrete logic, software, hardware, firmware or any combinations thereof. When the techniques are implemented partially in software, a device may store instructions for the software in a suitable, non-transitory computer-readable medium and execute the instructions in hardware using one or more processors to perform the techniques of this disclosure. Each of video encoder 20 and video decoder 30 may be included in one or more encoders or decoders, either of which may be integrated as part of a combined encoder/decoder (CODEC) in a respective device.

Output interface 22 may output encoded data to a storage device 33. Similarly, input interface 28 may access encoded data storage device 33. Storage device 33 may include any of a variety of distributed or locally accessed data storage media such as a hard drive, Blu-ray discs, DVDs, CD-ROMs, flash memory, volatile or non-volatile memory, or any other suitable digital storage media for storing encoded video data. In a further example, storage device 33 may correspond to a file server or another intermediate storage device that may hold the encoded video generated by source device 12. In examples where output interface 22 comprises a wireless transmitter, output interface 22 may be configured to transmit data, such as encoded video data, modulated according to a cellular communication standard, such as 4G, 4G-LTE, LTE Advanced, 5G, and the like. In some examples where output interface 22 comprises a wireless transmitter, output interface 22 may be configured to transmit data, such as encoded video data, modulated according to other wireless standards, such as an IEEE 802.11 specification, an IEEE 802.15 specification (e.g., ZigBee™), a Bluetooth™ standard, and the like. In some examples, circuitry of output interface 22 is integrated into circuitry of video encoder 20 and/or other components of source device 12. For example, video encoder 20 and output interface 22 may be parts of a system on a chip (SoC). The SoC may also include other components, such as a general purpose microprocessor, a graphics processing unit, and so on.

Destination device 14 may receive the encoded video data to be decoded via a link 16. Link 16 may comprise any type of medium or device capable of moving the encoded video data from source device 12 to destination device 14. In one example, link 16 may comprise a communication medium to enable source device 12 to transmit encoded video data directly to destination device 14 in real-time. The encoded video data may be modulated according to a communication standard, such as a wireless communication protocol, and transmitted to destination device 14. The communication medium may comprise any wireless or wired communication medium, such as a radio frequency (RF) spectrum or one or more physical transmission lines. The communication medium may form part of a packet-based network, such as a local area network, a wide-area network, or a global network such as the Internet. The communication medium may include routers, switches, base stations, or any other equipment that may be useful to facilitate communication from source device 12 to destination device 14.

Input interface 28 of destination device 14 receives data from link 16. Input interface 28 may comprise various types of components or devices. For example, input interface 28 may comprise a wireless receiver, a modem, a wired networking component (e.g., an Ethernet card), or another physical component. In examples where input interface 28 comprises a wireless receiver, input interface 28 may be configured to receive data, such as the bitstream, modulated according to a cellular communication standard, such as 4G, 4G-LTE, LTE Advanced, 5G, and the like. In some examples where input interface 28 comprises a wireless receiver, input interface 28 may be configured to receive data, such as the bitstream, modulated according to other wireless standards, such as an IEEE 802.11 specification, an IEEE 802.15 specification (e.g., ZigBee™), a Bluetooth™ standard, and the like. In some examples, circuitry of input interface 28 may be integrated into circuitry of video decoder 30 and/or other components of destination device 14. For example, video decoder 30 and input interface 28 may be parts of a SoC. The SoC may also include other components, such as a general purpose microprocessor, a graphics processing unit, and so on.

Destination device 14 may access stored video data from storage device 33 via streaming or download. The file server may be any type of server capable of storing encoded video data and transmitting that encoded video data to the destination device 14. Example file servers include a web server (e.g., for a website), an FTP server, network attached storage (NAS) devices, or a local disk drive. Destination device 14 may access the encoded video data through any standard data connection, including an Internet connection. This may include a wireless channel (e.g., a Wi-Fi connection), a wired connection (e.g., DSL, cable modem, etc.), or a combination of both that is suitable for accessing encoded video data stored on a file server. The transmission of encoded video data from storage device 33 may be a streaming transmission, a download transmission, or a combination of both.

The techniques of this disclosure are not necessarily limited to wireless applications or settings. The techniques may be applied to video coding in support of any of a variety of multimedia applications, such as over-the-air television broadcasts, cable television transmissions, satellite television transmissions, streaming video transmissions, e.g., via the Internet, encoding of digital video for storage on a data storage medium, decoding of digital video stored on a data storage medium, or other applications. In some examples, system 10 may be configured to support one-way or two-way video transmission to support applications such as video streaming, video playback, video broadcasting, and/or video telephony.

Furthermore, in the example of FIG. 1, video coding system 10 includes a file generation device 34. File generation device 34 may receive encoded video data (e.g., a bitstream) generated by source device 12. File generation device 34 may generate a file that includes the encoded video data. Destination device 14 may receive the file generated by file generation device 34. In various examples, file generation device 34 may include various types of computing devices. For instance, file generation device 34 may comprise a Media Aware Network Element (MANE), a server computing device, a personal computing device, a special-purpose computing device, a commercial computing device, or another type of computing device. In some examples, file generation device 34 is part of a content delivery network. File generation device 34 may receive the encoded video data from source device 12 via a channel such as link 16. Furthermore, destination device 14 may receive the file from file generation device 34 via a channel such as link 16. File generation device 34 may be considered a video device. File generation device 34 each may be implemented as any of a variety of suitable encoder circuitry, such as one or more microprocessors, digital signal processors (DSPs), application specific integrated circuits (ASICs), field programmable gate arrays (FPGAs), discrete logic, software, hardware, firmware or any combinations thereof. When the techniques are implemented partially in software, a device may store instructions for the software in a suitable, non-transitory computer-readable medium and execute the instructions in hardware using one or more processors to perform the techniques of this disclosure. File generation device 34 may comprise a memory configured to store a file for storage of video data.

In other examples, source device 12 or another computing device generates a file that includes the encoded video data. However, for ease of explanation, this disclosure describes file generation device 34 as generating the file. Nevertheless, it should be understood that such descriptions are applicable to computing devices in general.

In some examples, video encoder 20 and video decoder 30 operate according to a video compression standard, such as the High Efficiency Video Coding (HEVC) standard or an extension thereof. The HEVC standard may also be referred to as ISO/IEC 23008-2. A draft specification of HEVC, and referred to as HEVC WD hereinafter, is available from http://phenix.int-evry.fr/jct/doc_end_user/documents/14_Vienna/wg11/JCTVC-N1003-v1.zip. The multiview extension to HEVC, namely MV-HEVC, is also being developed by the JCT-3V. A recent Working Draft (WD) of MV-HEVC, titled "MV-HEVC Draft Text 5" and referred to as MV-HEVC WD5 hereinafter, is available from http://phenix.it-sudparis.eu/jct2/doc_end_user/documents/5_Vienna/wg11/JCT3V-E1004-v6.zip. The scalable extension to HEVC, named SHVC, is also being developed by the JCT-VC. A recent Working Draft (WD) of SHVC, titled "High efficiency video coding (HEVC) scalable extension draft 3" and referred to as SHVC WD3 hereinafter, is available from http://phenix.it-sudparis.eu/jct/doc_end_user/documents/14_Vienna/wg11/JCTVC-N1008-v3.zip. A recent working draft (WD) of the range extension of HEVC, is available from available from http://phenix.int-evry.fr/jct/doc_end_user/documents/14_Vienna/wg11/JCTVC-N1005-v3.zip. A recent working draft (WD) of the 3D extension of HEVC, namely 3D-HEVC, titled "3D-HEVC Draft Text 1" is available from http://phenix.int-evry.fr/jct2/doc_end_user/documents/5_Vienna/wg11/JCT3V-E1001-v3.zip. Video encoder 20 and video decoder 30 may operate according to one or more of these standards.

Alternatively, video encoder 20 and video decoder 30 may operate according to other proprietary or industry standards, such as the ITU-T H.264 standard, alternatively referred to as MPEG-4, Part 10, Advanced Video Coding (AVC), or extensions of such standards. The techniques of this disclosure, however, are not limited to any particular coding standard. Other examples of video compression standards include ITU-T H.261, ISO/IEC MPEG-1 Visual, ITU-T H.262 or ISO/IEC MPEG-2 Visual, ITU-T H.263, ISO/IEC MPEG-4 Visual and ITU-T H.264 (also known as ISO/IEC MPEG-4 AVC), including its Scalable Video Coding (SVC) and Multiview Video Coding (MVC) extensions.

Although not shown in FIG. 1, in some aspects, video encoder 20 and video decoder 30 may each be integrated with an audio encoder and decoder, and may include appropriate MUX-DEMUX units, or other hardware and software, to handle encoding of both audio and video in a common data stream or separate data streams. If applicable, in some examples, MUX-DEMUX units may conform to the ITU H.223 multiplexer protocol, or other protocols such as the user datagram protocol (UDP).

In general, HEVC describes that a video frame or picture is divided into a sequence of treeblocks or largest coding units (LCU) that include both luma and chroma samples. Treeblocks may also be referred to as Coding Tree Units (CTUs). A slice includes a number of consecutive treeblocks in coding order. A video frame or picture may be partitioned into one or more slices. Each treeblock may be split into coding units (CUs) according to a quadtree. For example, a treeblock, as a root node of the quadtree, may be split into four child nodes, and each child node may in turn be a parent node and be split into another four child nodes. A final, unsplit child node, as a leaf node of the quadtree, comprises a coding node, i.e., a coded video block. Syntax data associated with a coded bitstream may define a maximum number of times a treeblock may be split, and may also define a minimum size of the coding nodes.

A CU includes a coding node and prediction units (PUs) and transform units (TUs) associated with the coding node. A size of the CU corresponds to a size of the coding node and must be square in shape. The size of the CU may range from 8×8 pixels up to the size of the treeblock with a maximum of 64×64 pixels or greater. Each CU may contain one or more PUs and one or more TUs. Syntax data associated with a CU may describe, for example, partitioning of the CU into one or more PUs. Partitioning modes may differ between whether the CU is skip or direct mode encoded, intra-prediction mode encoded, or inter-prediction mode encoded. PUs may be partitioned to be non-square in shape. Syntax data associated with a CU may also describe, for example, partitioning of the CU into one or more TUs according to a quadtree. A TU can be square or non-square in shape.

HEVC allows for transformations according to TUs, which may be different for different CUs. The TUs are typically sized based on the size of PUs within a given CU defined for a partitioned LCU, although this may not always be the case. The TUs are typically the same size or smaller than the PUs. In some examples, residual samples corresponding to a CU may be subdivided into smaller units using a quadtree structure known as "residual quad tree" (RQT). The leaf nodes of the RQT may be referred to as TUs. Pixel difference values associated with the TUs may be transformed to produce transform coefficients, which may be quantized.

In general, a PU includes data related to the prediction process. For example, when the PU is intra-mode encoded, the PU may include data describing an intra-prediction mode for the PU. As another example, when the PU is inter-mode encoded, the PU may include data defining a motion vector for the PU. The data defining the motion vector for a PU may describe, for example, a horizontal component of the motion vector, a vertical component of the motion vector, a resolution for the motion vector (e.g., one-quarter pixel precision or one-eighth pixel precision), a reference picture to which the motion vector points, and/or a reference picture list (e.g., List 0, List 1, or List C) for the motion vector.

In general, a TU is used for the transform and quantization processes. A given CU having one or more PUs may also include one or more TUs. Following prediction, video encoder 20 may calculate residual values corresponding to the PU. The residual values comprise pixel difference values that may be transformed into transform coefficients, quantized, and scanned using the TUs to produce serialized transform coefficients for entropy coding. This disclosure typically uses the term "video block" to refer to a coding node (i.e., coding block) of a CU. In some specific cases, this disclosure may also use the term "video block" to refer to a treeblock, i.e., LCU, or a CU, which includes a coding node and PUs and TUs.

A video sequence typically includes a series of video frames or pictures. A group of pictures (GOP) generally comprises a series of one or more of the video pictures. A GOP may include syntax data in a header of the GOP, a header of one or more of the pictures, or elsewhere, that describes a number of pictures included in the GOP. Each slice of a picture may include slice syntax data that describes an encoding mode for the respective slice. Video encoder 20 typically operates on video blocks within individual video slices in order to encode the video data. A video block may correspond to a coding node within a CU. The video blocks may have fixed or varying sizes, and may differ in size according to a specified coding standard.

In this disclosure, "N×N" and "N by N" may be used interchangeably to refer to the pixel dimensions of a video block in terms of vertical and horizontal dimensions, e.g., 16×16 pixels or 16 by 16 pixels. In general, a 16×16 block has 16 pixels in a vertical direction (y=16) and 16 pixels in a horizontal direction (x=16). Likewise, an N×N block generally has N pixels in a vertical direction and N pixels in a horizontal direction, where N represents a nonnegative integer value. The pixels in a block may be arranged in rows and columns. Moreover, blocks need not necessarily have the same number of pixels in the horizontal direction as in the vertical direction. For example, blocks may comprise N×M pixels, where M is not necessarily equal to N.

Following intra-predictive or inter-predictive coding using the PUs of a CU, video encoder 20 may calculate residual data for the TUs of the CU. The PUs may comprise pixel data in the spatial domain (also referred to as the pixel domain) and the TUs may comprise coefficients in the transform domain following application of a transform, e.g., a discrete cosine transform (DCT), an integer transform, a wavelet transform, or a conceptually similar transform to residual video data. The residual data may correspond to pixel differences between pixels of the unencoded picture and prediction values corresponding to the PUs. Video encoder 20 may form the TUs including the residual data for the CU, and then transform the TUs to produce transform coefficients for the CU.

Following any transforms to produce transform coefficients, video encoder 20 may perform quantization of the transform coefficients. Quantization generally refers to a process in which transform coefficients are quantized to possibly reduce the amount of data used to represent the coefficients, providing further compression. The quantization process may reduce the bit depth associated with some or all of the coefficients. For example, an n-bit value may be rounded down to an m-bit value during quantization, where n is greater than m.

After scanning the quantized transform coefficients to form a one-dimensional vector, video encoder 20 may entropy encode the one-dimensional vector, e.g., according to context adaptive variable length coding (CAVLC), context adaptive binary arithmetic coding (CABAC), syntax-based context-adaptive binary arithmetic coding (SBAC), Probability Interval Partitioning Entropy (PIPE) coding or another entropy encoding methodology. Video encoder 20 may also entropy encode other syntax elements associated with the video data for use by video decoder 30 in decoding the video data.

Video encoder 20 may output a bitstream that includes a sequence of bits that forms a representation of coded pictures and associated data. The term "bitstream" may be a collective term used to refer to either a Network Abstraction Layer (NAL) unit stream (e.g., a sequence of NAL units) or a byte stream (e.g., an encapsulation of a NAL unit stream containing start code prefixes and NAL units as specified by Annex B of the HEVC standard). A NAL unit is a syntax structure containing an indication of the type of data in the NAL unit and bytes containing that data in the form of a raw byte sequence payload (RBSP) interspersed as necessary with emulation prevention bits. Each of the NAL units may include a NAL unit header and may encapsulate an RBSP. The NAL unit header may include a syntax element that indicates a NAL unit type code. The NAL unit type code specified by the NAL unit header of a NAL unit indicates the type of the NAL unit. A RBSP may be a syntax structure containing an integer number of bytes that is encapsulated within a NAL unit. In some instances, an RBSP includes zero bits.

Different types of NAL units may encapsulate different types of RBSPs. For example, a first type of NAL unit may encapsulate an RBSP for a picture parameter set (PPS), a second type of NAL unit may encapsulate an RBSP for a slice segment, a third type of NAL unit may encapsulate an RBSP for Supplemental Enhancement Information (SEI), and so on. NAL units that encapsulate RBSPs for video coding data (as opposed to RBSPs for parameter sets and SEI messages) may be referred to as video coding layer (VCL) NAL units. NAL units that contain parameter sets (e.g., video parameter sets (VPSs), sequence parameter sets (SPSs), PPSs, etc.) may be referred to as parameter set NAL units.

This disclosure may refer to a NAL unit that encapsulates an RBSP for a slice segment as a coded slice NAL unit. As defined in the HEVC WD, a slice segment is an integer number of CTUs ordered consecutively in tile scan and contained in a single NAL unit. In contrast, in the HEVC WD, a slice may be an integer number of CTUs contained in one independent slice segment and all subsequent dependent slice segments (if any) that precede the next independent slice segment (if any) within the same access unit. An independent slice segment is a slice segment for which values of the syntax elements of the slice segment header are not inferred from the values for a preceding slice segment. A dependent slice segment is a slice segment for which the values of some syntax elements of the slice segment header are inferred from the values for the preceding independent slice segment in decoding order. The RBSP of a coded slice NAL unit may include a slice segment header and slice data. A slice segment header is a part of a coded slice segment containing the data elements pertaining to the first or all CTUs represented in the slice segment. A slice header is a slice segment header of the independent slice segment that is a current slice segment or the most recent independent slice segment that precedes a current dependent slice segment in decoding order.

A VPS is a syntax structure comprising syntax elements that apply to zero or more entire coded video sequences (CVSs). An SPS is a syntax structure containing syntax elements that apply to zero or more entire CVSs. An SPS may include a syntax element that identifies a VPS that is active when the SPS is active. Thus, the syntax elements of a VPS may be more generally applicable than the syntax elements of a SPS.

A parameter set (e.g., a VPS, SPS, PPS, etc.) may contain an identification that is referenced, directly or indirectly, from a slice header of a slice segment. The referencing process is known as "activation." Thus, when video decoder 30 is decoding a particular slice, a parameter set referenced, directly or indirectly, by a syntax element in a slice header of the particular slice is said to be "activated." Depending on the parameter set type, the activation may occur on a per picture basis or a per sequence basis. For example, a slice header of a slice may include a syntax element that identifies a PPS. Thus, when a video coder codes the slice, the PPS may be activated. Furthermore, the PPS may include a syntax element that identifies a SPS. Thus, when a PPS that identifies the SPS is activated, the SPS may be activated. The SPS may include a syntax element that identifies a VPS. Thus, when an SPS that identifies the VPS is activated, the VPS is activated.

Video decoder 30 may receive a bitstream generated by video encoder 20. In addition, video decoder 30 may parse the bitstream to obtain syntax elements from the bitstream. Video decoder 30 may reconstruct the pictures of the video data based at least in part on the syntax elements obtained from the bitstream. The process to reconstruct the video data may be generally reciprocal to the process performed by video encoder 20. For instance, video decoder 30 may use motion vectors of PUs to determine predictive blocks for the PUs of a current CU. In addition, video decoder 30 may inverse quantize coefficient blocks of TUs of the current CU. Video decoder 30 may perform inverse transforms on the coefficient blocks to reconstruct transform blocks of the TUs of the current CU. Video decoder 30 may reconstruct the coding blocks of the current CU by adding the samples of the predictive blocks for PUs of the current CU to corresponding samples of the transform blocks of the TUs of the current CU. By reconstructing the coding blocks for each CU of a picture, video decoder 30 may reconstruct the picture. In the HEVC WD, a CVS may start from an Instantaneous Decoding Refresh (IDR) picture, or a broken link access (BLA) picture, or a clean random access (CRA) picture that is the first picture in the bitstream, including all subsequent pictures that are not IDR or BLA pictures.

In multi-view coding, there may be multiple views of the same scene from different viewpoints. The term "access unit" may be used to refer to the set of pictures that correspond to the same time instance. Thus, video data may be conceptualized as a series of access units occurring over time. A "view component" may be a coded representation of a view in a single access unit. In this disclosure, a "view" may refer to a sequence or set of view components associated with the same view identifier. A view component may contain a texture view component and a depth view component. In this disclosure, a "view" may refer to a set or sequence of one or more view components associated with the same view identifier.

In MV-HEVC, 3D-HEVC and SHVC, a video encoder may generate a bitstream that comprises a series of NAL units. Different NAL units of the bitstream may be associated with different layers of the bitstream. A layer may be defined as a set of VCL NAL units and associated non-VCL NAL units that have the same layer identifier. A layer may be equivalent to a view in multi-view video coding. In multi-view video coding, a layer can contain all view components of the same layer with different time instances. Each view component may be a coded picture of the video scene belonging to a specific view at a specific time instance. In some examples of 3D video coding, a layer may contain either all coded depth pictures of a specific view or coded texture pictures of a specific view. In other examples of 3D video coding, a layer may contain both texture view components and depth view components of a specific view. Similarly, in the context of scalable video coding, a layer typically corresponds to coded pictures having video characteristics different from coded pictures in other layers. Such video characteristics typically include spatial resolution and quality level (e.g., Signal-to-Noise Ratio). In HEVC and its extensions, temporal scalability may be achieved within one layer by defining a group of pictures with a particular temporal level as a sub-layer.

For each respective layer of the bitstream, data in a lower layer may be decoded without reference to data in any higher layer. In scalable video coding, for example, data in a base layer may be decoded without reference to data in an enhancement layer. In general, NAL units may only encapsulate data of a single layer. Thus, NAL units encapsulating data of the highest remaining layer of the bitstream may be removed from the bitstream without affecting the decodability of data in the remaining layers of the bitstream. In multi-view coding and 3D-HEVC, higher layers may include additional view components. In SHVC, higher layers may include signal to noise ratio (SNR) enhancement data, spatial enhancement data, and/or temporal enhancement data. In MV-HEVC, 3D-HEVC and SHVC, a layer may be referred to as a "base layer" if a video decoder can decode pictures in the layer without reference to data of any other layer. The base layer may conform to the HEVC base specification (e.g., HEVC WD).

In SVC, layers other than the base layer may be referred to as "enhancement layers" and may provide information that enhances the visual quality of video data decoded from the bitstream. SVC can enhance spatial resolution, signal-to-noise ratio (i.e., quality) or temporal rate. In scalable video coding (e.g., SHVC), a "layer representation" may be a coded representation of a spatial layer in a single access unit. For ease of explanation, this disclosure may refer to view components and/or layer representations as "view components/layer representations" or simply "pictures."

To implement the layers, headers of NAL units may include nuh_reserved_zero_6 bits syntax elements. In the HEVC WD, the nuh_reserved_zero_6 bits syntax element is reserved. However, in MV-HEVC, 3D-HEVC, and SHVC, the nuh_reserved_zero_6 bits syntax element is referred to as the nuh_layer_id syntax element. The nuh_layer_id syntax element specifies an identifier of a layer. NAL units of a bitstream that have nuh_layer_id syntax elements that specify different values belong to different layers of the bitstream.

In some examples, the nuh_layer_id syntax element of a NAL unit is equal to 0 if the NAL unit relates to a base layer in multi-view coding (e.g., MV-HEVC), 3DV coding (e.g. 3D-HEVC), or scalable video coding (e.g., SHVC). Data in a base layer of a bitstream may be decoded without reference to data in any other layer of the bitstream. If a NAL unit does not relate to a base layer in multi-view coding, 3DV, or scalable video coding, the nuh_layer_id syntax element of the NAL unit may have a non-zero value.

Furthermore, some view components/layer representations within a layer may be decoded without reference to other view components/layer representations within the same layer. Thus, NAL units encapsulating data of certain view components/layer representations of a layer may be removed from the bitstream without affecting the decodability of other view components/layer representations in the layer. Removing NAL units encapsulating data of such view components/layer representations may reduce the frame rate of the bitstream. A subset of view components/layer representations within a layer that may be decoded without reference to other view components/layer representations within the layer may be referred to herein as a "sub-layer" or a "temporal sub-layer."

NAL units may include temporal_id syntax elements that specify temporal identifiers (i.e., TemporalIds) of the NAL units. The temporal identifier of a NAL unit identifies a sub-layer to which the NAL unit belongs. Thus, each sub-layer of a bitstream may have a different temporal identifier. In general, if the temporal identifier of a first NAL unit of a layer is less than the temporal identifier of a second NAL unit of the same layer, the data encapsulated by the first NAL unit may be decoded without reference to the data encapsulated by the second NAL unit.

As described in section 3.160 of HEVC, a tile is a rectangular region of coding tree blocks within a particular tile column and a particular tile row in a picture. HEVC tiles do not have coding dependencies with other HEVC tiles in the same coded picture but may have coding dependencies with other HEVC tiles from previous coded pictures or may be independently decoded. However, in some examples, there may be parsing dependencies between HEVC tiles.

Figure 2:
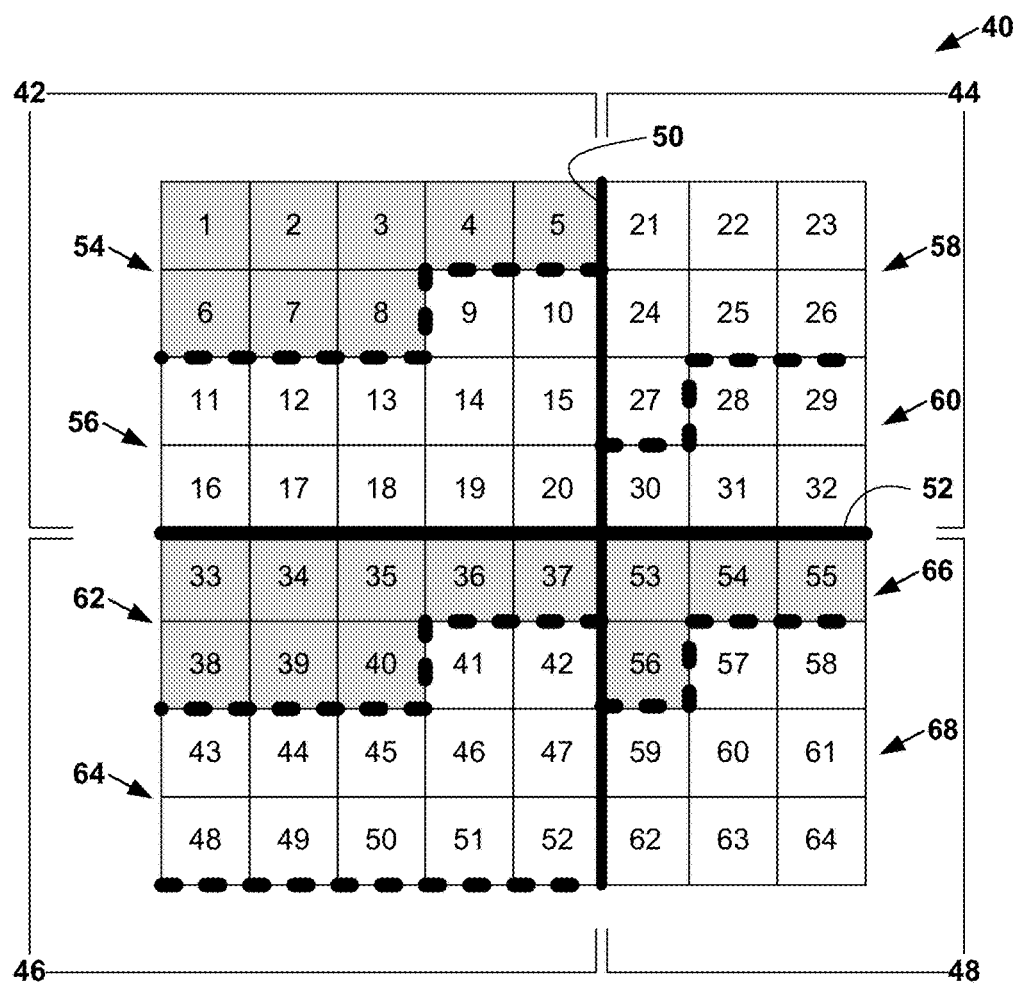
FIG. 2 is a conceptual diagram illustrating example tiles and slices.

FIG. 2 is a conceptual diagram illustrating example tiles and slices. In the example of FIG. 2, a picture 40 has 64 luma CTBs, each represented as a small square. Furthermore, picture 40 has four tiles, 42, 44, 46, 48 separated by a vertical tile boundary 50 and a horizontal tile boundary 52. Tiles 42 and 44 form a first tile row and tiles 46 and 48 form a second, different tile row. Moreover, tiles 42 and 46 form a first tile column and tiles 44 and 48 form a second, different tile column. Tile boundaries are represented as thick lines in FIG. 2.

In the example of FIG. 2, no CTB in tile 46 may depend on a CTB in tile 42, even if the CTB in tile 42 is adjacent to the CTB in tile 46. A tile column is a rectangular region of coding tree blocks having a height equal to the height of the picture and a width specified by syntax elements (e.g., in the picture parameter set). A tile row is a rectangular region of coding tree blocks having a height specified by syntax elements (e.g., in the picture parameter set) and a width equal to a width of the picture.

Picture 40 has eight slice segments 54, 56, 58, 60, 62, 64, 66, and 68. In the example of FIG. 2, slice segment boundaries are indicated with dashed lines. Furthermore, in the example of FIG. 2, slice segments with shaded CTBs are independent slice segments and slice segments with white CTBs are dependent slice segments. In HEVC, each coded block of a slice segment is contained in a NAL unit for the slice segment. Furthermore, in HEVC, a NAL unit does not include coded blocks of multiple slice segments.

In the example of FIG. 2, the numbers in each of the CTBs indicates a coding order of the CTBs. As shown in FIG. 2, tile boundaries may change the coding order of CTBs in picture 40. For instance, in the absence of tile boundaries 50 and 52, a video coder may code all CTBs in a complete row of CTBs in picture 40 before coding any CTB of the next lower row of CTBs in picture 40.

As described in Section 6.3.1 of HEVC, unlike slices, tiles are always rectangular. A tile always contains an integer number of CTUs, and may consist of CTUs contained in more than one slice. Similarly, a slice may comprise or consist of CTUs contained in more than one tile. Furthermore, as described in Section 6.3.1 of HEVC, one or both of the following conditions shall be fulfilled for each slice and tile: (1) all CTUs in a slice belong to the same tile; and (2) all CTUs in a tile belong to the same slice. Additionally, one or both of the following conditions shall be fulfilled for each slice segment and tile: (1) all CTUs in a slice segment belong to the same tile; and (2) all CTUs in a tile belong to the same slice segment.

File formats and file format standards will now be briefly discussed. File format standards include ISO base media file format (ISOBMFF, ISO/IEC 14496-12, hereinafter, "ISO/IEC 14996-12") and other file format standards derived from the ISOBMFF, including MPEG-4 file format (ISO/IEC 14496-14), 3GPP file format (3GPP TS 26.244) and AVC file format. Thus, ISO/IEC 14496-12 specifies the ISO base media file format. ISO/IEC 14496-12, $5^{th}$ edition, is a recent version of ISO/IEC 14496-12. Other documents extend the ISO base media file format for specific applications. For example, ISO/IEC FDIS 14496-15:2014 describes the carriage of NAL unit structured video in the ISO base media file format. H.264/AVC and HEVC, as well as their extensions, are examples of NAL unit structured video. ISO/IEC FDIS 14496-15:2014 includes sections describing the carriage of H.264/AVC NAL units. Additionally, section 8 of ISO/IEC FDIS 14496-15:2014 describes the carriage of HEVC NAL units.

The ISOBMFF is used as the basis for many codec encapsulation formats, such as the AVC File Format, as well as for many multimedia container formats, such as the MPEG-4 File Format, the 3GPP File Format (3GP), and the DVB File Format. In addition to continuous media, such as audio and video, static media, such as images, as well as metadata, can be stored in a file conforming to ISOBMFF. Files structured according to the ISOBMFF may be used for many purposes, including local media file playback, progressive downloading of a remote file, segments for Dynamic Adaptive Streaming over HTTP (DASH). ISOBMFF-structured files can also be used as containers or "wrappers" for content to be streamed and packetization instructions for the content, as well as for recording of received real-time media streams. Thus, although originally designed for storage, the ISOBMFF has proven valuable for streaming, e.g. for progressive download or DASH. For streaming purposes, the movie fragments defined in ISOBMFF can be used.

Figure 6:
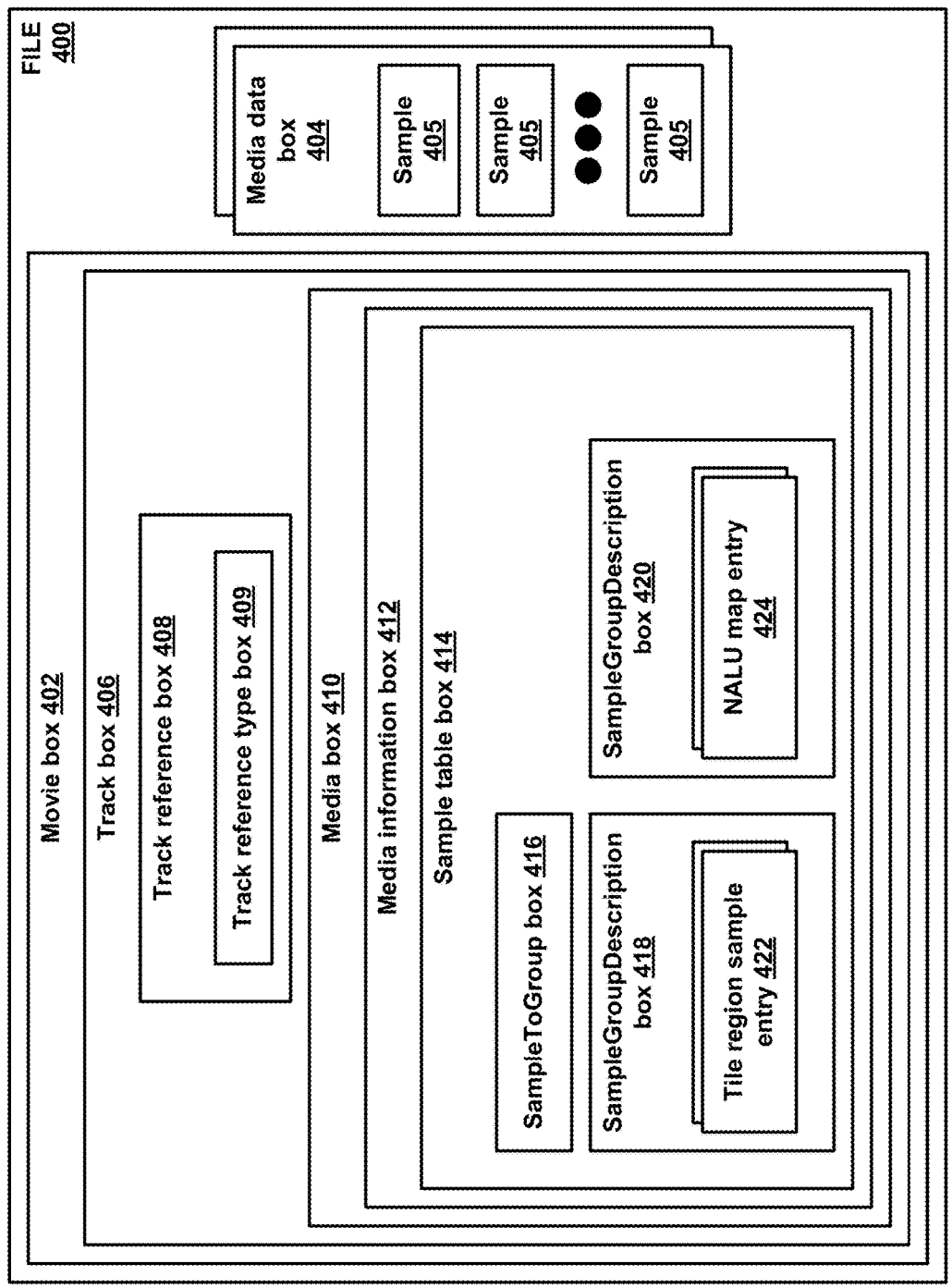
FIG. 6 is a conceptual diagram illustrating an example structure of a file, in accordance with one or more techniques of this disclosure.

A file conforming to the HEVC file format may comprise a series of objects, called boxes. A box may be an object-oriented building block defined by a unique type identifier and length. For instance, a box may be the elementary syntax structure in the ISOBMFF, including a four-character coded box type, a byte count of the box, and a payload. In other words, a box may be a syntax structure comprising a coded box type, a byte count of the box, and a payload. An ISOBMFF-compliant file includes a sequence of boxes, and the boxes may contain other boxes. In some instances, all data in a file conforming to the HEVC file format may be contained within boxes and there may be no data in the file that is not in a box. Thus, an ISOBMFF file may include a sequence of boxes, and boxes may contain other boxes. For instance, the payload of a box may include one or more additional boxes. FIG. 6, described in detail elsewhere in this disclosure, shows example boxes within a file, in accordance with one or more techniques of this disclosure.

A file conforming to the ISOBMFF may include various types of boxes. For example, a file conforming to the ISOBMFF may include a file type box, a media data box, a movie box, a movie fragment box, and so on. In this example, a file type box includes file type and compatibility information. A media data box may contain samples (e.g., coded pictures). A movie box ("moov") contains metadata for continuous media streams present in the file. Each of the continuous media streams may be represented in the file as a track. For instance, a movie box may contain metadata regarding a movie (e.g., logical and timing relationships between samples, and also pointers to locations of samples). Movie boxes may include several types of sub-boxes. The sub-boxes in a movie box may include one or more track boxes. A track box may include information about an individual track of a movie. A track box may include a track header box that specifies overall information of a single track. In addition, a track box may include a media box that contains a media information box. The media information box may include a sample table box that contains data indexing of media samples in the track. Information in the sample table box may be used to locate samples in time and, for each of the samples of the track, a type, size, container, and offset into that container of the sample. Thus, the metadata for a track is enclosed in a track box ("trak"), while the media content of a track is either enclosed in a media data box ("mdat") or directly in a separate file. The media content for tracks comprises or consists of a sequence of samples, such as audio or video access units.

The ISOBMFF specifies the following types of tracks: (i) a media track, which contains an elementary media stream, (ii) a hint track, which either includes media transmission instructions or represents a received packet stream, and (iii) a timed metadata track, which includes time-synchronized metadata. The metadata for each track includes a list of sample description entries, each providing the coding or encapsulation format used in the track and the initialization data needed for processing that format. Each sample is associated with one of the sample description entries of the track.

The ISOBMFF specification specifies six types of Stream Access Points (SAPs) for use with DASH. The first two SAP types (types 1 and 2) correspond to Instantaneous Decoder Refresh (IDR) pictures in H.264/AVC and HEVC. The third SAP type (type 3) corresponds to open group of pictures (open-GOP) random access points, hence broken link access (BLA) or clean random access (CRA) pictures in HEVC. The fourth SAP type (type 4) corresponds to gradual decoder refresh (GDR) random access points.

The ISOBMFF enables specifying sample-specific metadata with various mechanisms. Specific boxes within the Sample Table box ("stbl") have been standardized to respond to common needs. For example, a Sync Sample box ("stss") is a box within a Sample Table box. The Sync Sample box is used to list the random access samples of the track. This disclosure may refer to a sample listed by the Sync Sample box as a sync sample. In another example, a sample grouping mechanism enables mapping of samples according to a four-character grouping type into groups of samples sharing the same property specified as a sample group description entry in the file. Several grouping types have been specified in the ISOBMFF.

Furthermore, to include a NAL unit in a track of a file, a computing device may include the NAL unit in a sample. In some instances, the computing device stores the samples in media data boxes. In other instances, the computing device stores the sample directly in the file without encapsulating the sample in a media data box. Samples are clustered in the file in "chunks." Furthermore, the computing device may generate a sample table box in a track box for the track. The sample table box includes a Chunk Offset Box (e.g., a box with identifier 'stco' or 'co64'). A Chunk Offset Box for a track (i.e., a Chunk Offset Box in a sample table box in a track box for a track) includes data specifying starting locations and/or offsets of chunks containing samples of the track. Thus, by generating the Chunk Offset Box to indicate a chunk containing a NAL unit, a device may include the NAL unit in the track. The Chunk Offset Box may specify the starting locations and/or offsets of the chunks relative to a beginning of the file. The sample table box of the track may also include a Sample To Chunk box (e.g., a box with identifier 'stsc'). A device may use the Sample To Chunk box to construct a table that indicates which samples are in which chunks. For instance, the table may indicate that samples 20 through 30 are in chunk 2. In addition, the sample table box of the track includes a sample size box (e.g., a box with identifier 'stsz' or 'stz2'). As described in § 8.5.3.1 of ISOBMFF 14996-12, a device may use information in the sample size box to generate a table indicating sizes of samples in the track. Furthermore, each sample may include data indicating the size of each NAL unit in the sample.

A sample table box may include one or more SampleToGroup boxes and one or more sample group description boxes (i.e., SampleGroupDescription boxes). A SampleToGroup box may be used to determine a sample group to which a sample belongs, along with an associated description of the sample group. In other words, a SampleToGroup box may indicate a group to which a sample belongs. A SampleToGroup box may have a box type of "sbgp." A SampleToGroup box may include a grouping type element (e.g., grouping_type). The grouping type element may be an integer that identifies a type (i.e., a criterion used to form the sample groups) of a sample grouping. Furthermore, a SampleToGroup box may include one or more entries. Additionally, a SampleGroupDescription box may include one or more sample group description entries. Each entry in a SampleToGroup box may be associated with a different, non-overlapping series of consecutive samples in the track. Each entry in a SampleToGroup box may indicate a sample count element (e.g., sample_count) and a group description index element (e.g., group_description_index). The sample count element of an entry may indicate a number of samples associated with the entry. In other words, the sample count element of the entry may be an integer that gives the number of consecutive samples with the same sample group descriptor. The group description index element may identify a group description entry in a SampleGroupDescription box. The identified group description entry contains a description of the samples associated with the entry. The group description index elements of multiple entries of a SampleToGroup box may identify the same SampleGroupDescription box.

The syntax of the SampleToGroup box, as defined in ISO/IEC 14496-12, 5$^{th}$ Edition, is reproduced below:

```
aligned(8) class SampleToGroupBox
  extends FullBox('sbgp', version, 0)
{
  unsigned int(32)      grouping_type;
  if (version == 1) {
    unsigned int(32) grouping_type_parameter;
  }
  unsigned int(32)      entry_count;
```

-continued

```
  for (i=1; i <= entry_count; i++)
  {
    unsigned int(32)      sample_count;
    unsigned int(32)      group_description_index;
  }
}
```

The following summarizes the semantics of the syntax elements in the SampleToGroup box as defined in ISO/IEC 14496-12, 5$^{th}$ edition:

"version" is an integer that specifies the version of this box, either 0 or 1.

"grouping_type" is an integer that identifies the type (i.e. criterion used to form the sample groups) of the sample grouping and links it to its sample group description table with the same value for grouping type. At most one occurrence of this box with the same value for grouping_type (and, if used, grouping_type_parameter) shall exist for a track.

"grouping_type_parameter" is an indication of the sub-type of the grouping.

"entry_count" is an integer that gives the number of entries in the following table.

"sample_count" is an integer that gives the number of consecutive samples with the same sample group descriptor. If the sum of the sample count in this box is less than the total sample count, or there is no sample-to-group box that applies to some samples (e.g. it is absent from a track fragment), then the reader should associate the samples that have no explicit group association with the default group defined in the SampleDescriptionGroup box, if any, or else with no group. It is an error for the total in this box to be greater than the sample_count documented elsewhere, and the reader behaviour would then be undefined.

"group_description_index" is an integer that gives the index of the sample group entry which describes the samples in this group. The index ranges from 1 to the number of sample group entries in the SampleGroupDescription Box, or takes the value 0 to indicate that this sample is a member of no group of this type.

The syntax of the SampleGroupDescription box as defined in ISO/IEC 14496-12, 5$^{th}$ Edition, are reproduced below:

```
aligned(8) class SampleGroupDescriptionBox (unsigned int(32) handler_type)
  extends FullBox('sbgp', version, 0){
  unsigned int(32) grouping_type;
  if (version==1) {unsigned int(32) default_length; }
  if (version>=2) {
    unsigned int(32) default_sample_description_index;
  }
  unsigned int(32) entry_count;
  int i;
  for (i = 1; i <= entry_count ; i++){
    if (version==1) {
      if (default_length==0) {
        unsigned int(32) description_length;
      }
    }
    SampleGroupEntry (grouping_type);
    // an instance of a class derived from SampleGroupEntry
    // that is appropriate and permitted for the media type
  }
}
```

ISO/IEC 14496-12, 5$^{th}$ Edition, defines the semantics of the syntax elements of the SampleGroupDescription box as follows:

"version" is an integer that specifies the version of this box.

"grouping_type" is an integer that identifies the SampleToGroup box that is associated with this sample group description. If grouping_type_parameter is not defined for a given grouping_type, then there shall be only one occurrence of this box with this grouping_type.

"default_sample_description_index" specifies the index of the sample group description entry which applies to all samples in the track for which no sample to group mapping is provided through a SampleToGroup box. The default value of this field is zero (indicating that the samples are mapped to no group of this type).

"entry_count" is an integer that gives the number of entries in the following table.

"default_length" indicates the length of every group entry (if the length is constant), or zero (0) if it is variable.

"description_length" indicates the length of an individual group entry, in the case it varies from entry to entry and default_length is therefore 0.

As indicated above, a SampleGroupDescription box may include one or more group description entries. Different types of group description entries may include different types of information. For example, group description entries that include information regarding visual samples belong to the class VisualSampleGroupEntry, group description entries that include information regarding audio samples belong to the class AudioSampleGroupEntry, and so on. In ISO/IEC 14496-12, the VisualSampleGroupEntry class is abstract. Thus, various more specialized classes of group description entries extend the VisualSampleGroupEntry class. As described in detail elsewhere in this disclosure, RectTileRegGroupEntry and UnconstrTileRegGroupEntry are two classes that extend the VisualSampleGroupEntry class. The RecTileRegGroupEntry class has the group type identifier 'trif' and the UnconstrTileRegGroupEntry class has the group type identifier 'tsif'. Group description entries instantiating the RecTileRegGroupEntry class include syntax elements describing samples that contain rectangular tile regions. Group description entries instantiating the UnconstrTileRegGroupEntry class include syntax elements describing samples that contain unconstrained tile regions.

In another example, the NALUMapEntry class extends the Visual SampleGroupEntry class. This disclosure may refer to instances of the NALUMapEntry class as NALU map entries. NALU map entries may be used to assign an identifier (groupID) to NAL units. The syntax of the NALUMapEntry class, as defined in ISO/IEC 144916-15:2014, is reproduced below:

```
class NALUMapEntry( ) extends VisualSampleGroupEntry ('nalm') {
  bit(6) reserved = 0;
  unsigned int(1) large_size;
  unsigned int(1) rle;
  if (large_size) {
    unsigned int(16) entry_count;
  } else {
    unsigned int(8) entry_count;
  }
  for (i=1; i<= entry_count; i++) {
    if (rle) {
      if (large_size) {
        unsigned int(16) NALU_start_number;
      } else {
        unsigned int(8) NALU_start_number;
      }
    }
    unsigned int(16) groupID;
  }
}
```

ISO/IEC 144916-15:2014 defines the semantics of the syntax elements of the NALUMapEntry class as follows:

"large_size" indicates whether the number of NAL unit entries in the track samples is represented on 8 or 16 bits.

"rle" indicates whether run-length encoding is used (1) to assign groupID to NAL units or not (0).

"entry_count" specifies the number of entries in the map. Note that when rle is equal to 1, the entry_count corresponds to the number of runs where consecutives NAL units are associated with the same group. When rle is equal to 0, entry_count represents the total number of NAL units.

"NALU_start_number" is the 1-based NAL unit index in the sample of the first NAL unit in the current run associated with groupID.

"groupID" specifies the unique identifier of the group. More information about the group is provided by the sample group description entry with this groupID and grouping_type equal to the grouping_type_parameter of the SampleToGroup box of type 'nalm'.

SampleGroupDescription boxes may only include sample group description entries of one class. For example, each sample group description entry in a SampleGroupDescription box may be an instance of the NALUMapEntry class.

Scenarios exist where it is useful to obtain information about tiles at the file level, as opposed to determining the information about the tiles at a codec (e.g., HEVC) level. For example, in FIG. 2, suppose that tiles 46 and 48 correspond to the crawl at the bottom of a newscast while tiles 42 and 44 contain images of a news anchorperson. In this example, the crawl may include text about other news, sports scores, school closings, stock quotes, etc. In this example, it may be desirable to stream only the part of picture 40 that includes the images of the news anchorperson without streaming the crawl. Reducing the streamed content of a video in this manner may be desirable when streaming the video to a device with a small screen, such as a smartphone or smartwatch. At the same time, the full version of the same video, which includes tiles 46 and 48, may be streamed to a device for presentation on a larger screen, such as a television.

To ease extraction of different tiles of a picture, individual tiles or groups of tiles may be stored in different tracks of a file. A device can then perform extraction at a track level. For example, in FIG. 2, a first track may include encoded video data for tiles 42 and 44 and a second track may include encoded video data for tiles 46 and 48. In this example, to stream tiles 42 and 44 without streaming tiles 46 and 48, a device may output the first track the file and not the second track. However, to extract tracks containing desired the tiles, a device may need information about the tiles included in the tracks of a file.

Accordingly, ISO/IEC FDIS 14496-15:2014 provides tools for describing and manipulating tiles at the file level. For example, section 10.1 of ISO/IEC FDIS 14496-15:2014 defines the concepts of a tile region and a tile set. A tile region is a rectangular region that includes one or more tiles. A tile region may also be referred to as a rectangular tile region. For instance, in the example of FIG. 2, tiles 42 and 44 may form a tile region; tiles 42 and 46 may form a tile region, tiles 44 and 48 may form a tile region, tiles 46 and 48 may form a tile region, and tiles 42, 44, 46, and 48 may form a tile region. Several tiles coded in a single slice can be grouped as a set of tiles, called a tile set. A tile set may also be referred to as an unconstrained tile region. For instance, in the example of FIG. 2, a tile set may consist of tile 42, tile 46, and tile 48. However, in the example of FIG. 2, tile 42, tile 46, and tile 48 cannot form a tile region because tiles 42, 46 and 48 are not a single rectangular region. Tile sets can be used to represent a region of interest spanning over several HEVC tiles. For example, a tile set may consist of tiles 42, 44, and 46. In this example, tiles 42, 44, and 46 may correspond to live video streams while tile 48 includes an image that is static over many pictures.

Current file format designs present one or more potential problems. As described below, such problems may relate to one or more of the following: (i) the relationship among sample entry for tile region, NALU map entry and SampleToGroup boxes; (ii) the presence of base track(s) for tile tracks; and (iii) the definition of rectangular tile region and unconstrained tile region.

The existing file format characteristics discussed above present one or more potential issues. Various potential issues relating to the relationship among sample entry for a tile region, NALU map entry and SampleToGroup boxes are discussed below. As used herein, "NALU" represents a network abstraction layer (NAL) unit.

As mentioned above, one or more tile regions can be grouped as a rectangular tile region and/or an unconstrained tile region. The rectangular and unconstrained tile regions are described by RectTileRegGroupEntry ('trif') and UnconstrTileRegGroupEntry ('tsif'), respectively, which are both extensions of VisualSampleGroupEntry. A SampleGroupDescription box may include instances the RectTileRegGroupEntry class or instances of the UnconstrTileRegGroupEntry.

The following text describes the syntax and semantics of the rectangular tile region group entry:

```
class TileRegionGroupEntry( ) extends Visual SampleGroupEntry ('trif')
{
    unsigned int(16) groupID;
    unsigned int(1) tile_region_flag;
    if (!tile_region_flag)
        bit(7) reserved = 0;
    else {
        unsigned int(2) independent_idc;
        unsigned int(1) full_picture;
        unsigned int(1) filtering_disabled;
        unsigned int(1) has_dependency_list;
        bit(2) reserved = 0;
        if (!full_picture) {
            unsigned int(16) horizontal_offset;
            unsigned int(16) vertical_offset;
        }
        unsigned int(16) region_width;
        unsigned int(16) region_height;
        if (has_dependency_list) {
            unsigned int(16) dependency_tile_count;
            for (i=1; i<= dependency_tile_count; i++)
                unsigned int(16) dependencyTileGroupID;
        }
    }
}
```

Semantics groupID is a unique identifier for the tile region group described by this sample group entry. The value of groupID in a tile region group entry shall be greater than 0. The value 0 is reserved for a special use.

When there is SampleToGroupBox of type 'nalm' and grouping_type_parameter equal to 'trif', a SampleGroupDescriptionBox of type 'trif' shall be present, and the following applies:

The value of groupID in a tile region group entry shall be equal to the groupID in one of the entries of NALUMapEntry.

A NAL unit being mapped to groupID 0 by a NALUMapEntry implies that the NAL unit is required for decoding any tile region in the same coded picture as this NAL unit.

NOTE 1: There may be multiple tile region group entries with the same values of horizontal_offset, vertical_offset, region_width and region_height, respectively, but with different groupID values, for describing varying dependencies.

tile_region_flag equal to 1 specifies that the region covered by the NAL units within a picture and associated with this tile region group entry is a tile region, and further information of the tile region is provided by subsequent fields in this tile region group entry. The value 0 specifies that the region covered by the NAL units within a picture and associated with this tile region group entry is not a tile region, and no further information of the region is provided in this tile region group entry.

When a multi-layer bitstream is carried in one or more tracks, for any two layers layerA and layerB of the bitstream, the following constraint applies: When a NAL unit of layerA is associated with a groupID value gIdA for which the corresponding tile_region_flag is equal to 1, and a NAL unit of layerB is associated with a groupID value gIdB for which the corresponding tile_region_flag is equal to 1, gIdA shall not be equal to gIdB.

independent_idc specifies the coding dependencies between each tile region associated with this tile region group entry and other tile regions in the same picture or in reference pictures of the same layer. Inter-layer dependencies, if any, are indicated by a list of dependencyTileGroupID (when has_dependency_list is equal to 1).

This field takes the following values:

If independent_idc equals 0, the coding dependencies between this tile region and other tile regions in the same picture or in reference pictures of the same layer is either described by a list of dependencyTileGroupID (when has_dependency_list is equal to 1) or unknown (when has_dependency_list is equal to 0).

If independent_idc equals 1, there are no temporal dependencies between this tile region and the tile regions with different groupID in any reference pictures of the same layer but there can be coding dependencies between this tile region and a tile region with the same groupID in a reference picture of the same layer.

If independent_idc equals 2, there are no coding dependencies between this tile region and any tile region in a reference picture of the same layer.

The value 3 is reserved.

full_picture, when set, indicates that each tile region associated with this tile region group entry is a complete picture, in which case region_width and region_height shall be set to the width and height, respectively, of the complete picture, and independent_idc shall be set to 1 or 2.

filtering_disabled, when set, indicates that for each tile region associated with this tile region group entry the in-loop filtering operation does not require access to pixels adjacent to this tile region, i.e., bit-exact reconstruction of the tile region is possible without decoding the adjacent tiles.

has_dependency_list, when set to 1, indicates that dependency_tile_count and, when dependency_tile_count is greater than 0, a list of dependencyTileGroupID are present. When set to 0, dependency_tile_count is not present and no dependencyTileGroupID is present.

horizontal_offset and vertical_offset give respectively the horizontal and vertical offsets of the top-left pixel of the rectangular region that is covered by the tiles in each tile region associated with this tile region group entry, relative to the top-left pixel of the base region, in luma samples. For HEVC and L-HEVC tile tracks as defined in this part of ISO/IEC 14496-15, the base region used in the TileRegionGroupEntry is the picture to which the tiles in a tile region associated with this tile region group entry belongs.

region_width and region_height give respectively the width and height of the rectangular region that is covered by the tiles in each tile region associated with this tile region group entry, in luma samples.

NOTE 2: For L-HEVC streams using spatial scalability and tiling on both the base and enhancement layers, when each layer is carried in its own track, the TileRegionGroupEntry sample descriptions of the base layer will give coordinates expressed in luma samples of the base layer, while the TileRegionGroupEntry sample descriptions of an enhancement layer will give coordinates expressed in luma samples of the enhancement layer.

dependency_tile_count indicates the number of tile regions each tile region associated with this tile region group entry depends on.

dependencyTileGroupID gives the groupID of a tile region (as defined by a TileRegionGroupEntry) that this tile region depends on. For a particular tile region associated with this tile region group entry, the tile regions it depends on may be from the same layer or the reference layers.

In many cases, each sample grouping entry that is contained within SampleGroupDescription box has a correspondence to SampleToGroup box which maps a sample to the sample grouping. However, for tile region groupings (i.e., rectangular tile region and unconstrained tile region groupings), the mapping between samples and tile region groupings may be described by a NALU map entry ('nalm') which is also an extension of VisualSampleGroupEntry. Thus, there are multiple ways of indicating tile regions in a SampleToGroup box.

As noted above, a sample table box of a track may include a first SampleGroupDescription box, a second SampleGroupDescription box, and a SampleToGroup box. The first SampleGroupDescription box has a "grouping_type" syntax element equal to 'nalm' and comprises NALU map entries. Each NALU map entry in the first SampleGroupDescription box specifies a mapping of NAL units to "groupID" values. For instance, a NALU map entry in the first SampleGroupDescription box may specify that NAL units 0 through 10 are associated with a "groupID" value of 1, that NAL units 11 through 20 are associated with a "groupID" value of 2, and so on. The SampleToGroup box includes a "grouping_type" syntax element having the value of 'nalm' and a "grouping_type_parameter" syntax element having a value equal to a second type identifier, such as 'trif' or 'tsif.' The second SampleGroupDescription box has a "grouping_type" syntax element equal to the second type identifier specified by the "grouping_type_parameter" syntax element of the SampleToGroup box. The second SampleGroupDescription box includes a set of group description entries, such as tile region sample entries (e.g., group description entries belonging to the classes RectTileRegGroupEntry or UnconstrTileRegGroupEntry). Each group description entry in the second SampleGroupDescription box includes a "groupID" syntax element. A group description entry in the second SampleGroupDescription box having a particular value of the "groupID" syntax element describes NAL units mapped to the particular value of the "groupID" syntax element in the first SampleGroupDescription box.

Thus, to determine which NAL units are associated with a desired tile region, a device may identify a first SampleGroupDescription box in a sample table box. The group description entries in the first SampleGroupDescription box describe tile regions, such as rectangular tile regions or unconstrained tile regions. In other words, the group description entries in the first SampleGroupDescription box are tile region sample entries. The tile region sample entries in the first SampleGroupDescription box are instances of a group description entry class having a particular type identifier, such as 'trif' or 'tsif'. The device may then determine which of the tile region sample entries in the first SampleGroupDescription box corresponds to the desired tile region. The device may then identify a SampleToGroup box having a "grouping_type" syntax element specifying the type identifier 'nalm' and a "grouping_type_parameter" syntax element specifying the particular type identifier. Next, the device may identify a second SampleGroupDescription box, where the second SampleGroupDescription box has a four-character type identifier of 'nalm'. The device may then determine, based on a NALUMapEntry in the second SampleGroupDescription box, which NAL units are associated with the value of the "groupID" syntax element specified by the identified group description entry in the first SampleGroupDescription box. A device may perform the reverse of this process to determine which, if any, tile regions are associated with a particular NAL unit.

Furthermore, this disclosure describes a tile region sample entry as being "associated with" a NALU map entry when: (1) the NALU map entry is in a corresponding SampleGroupDescription box, and (2) a group identifier syntax element (e.g., "groupID") in the NALU map entry specifies a value equal to a value specified by a group identifier syntax element in the tile region sample entry. The corresponding SampleGroupDescription box has a grouping type syntax element (e.g., grouping_type) specifying a type identifier (e.g., 'nalm') equal to a type identifier of a grouping type syntax element of a SampleToGroup box having a grouping type parameter syntax element (e.g., grouping_type_parameter) specifying a type identifier (e.g., 'trif' or 'tsif') of the NALU map entry.

This disclosure may describe a tile region sample entry as being "associated with" a SampleToGroup box when a grouping type syntax element of the SampleToGroup box specifies a type identifier (e.g., 'trif' or 'tsif') matching a grouping type syntax element of a SampleGroupDescription box containing the tile region sample entry.

As noted above, ISO/IEC 14996-15 allows for different tracks of a file to contain encoded data corresponding to different tiles. A goal of including encoded data corresponding to different tiles in different tracks is to allow a device to easily extract particular tracks while not extracting other tracks of the tile. This disclosure may refer to a track containing coded slice NAL units for one or more tiles as a tile track. In this scenario, a video decoder is ideally able to decode only the encoded video data in the extracted tile tracks. However, a bitstream may include parameter sets, such as VPSs, SPSs, and PPSs, that are common to each tile of a picture. Thus, these parameter sets may need to be present for a video decoder to decode the encoded video data of any tile track or combination of tile tracks. To ensure that the parameter sets are available, ISO/IEC 14995-15 provides for a base tile track. This disclosure may also refer to the base tile track as a base track for a tile track. A track reference (denoted the 'tbas' track reference) in the metadata of the file may identify the base tile track. The base tile track includes the samples comprising the parameter sets. The tile tracks of a file do not include the parameter sets. When extracting a tile track, the device also extracts the base tile track. Thus, a device receiving the extracted tile track also receives the base tile track.

A track box may include a track reference box. As described in § 8.3.3 of ISO/IEC 14496-12, 5$^{th}$ Edition, the track reference box provides a reference from the containing track (i.e., the track containing the track reference box) to another track in a presentation. In the context of ISO/IEC 14496-12, 5$^{th}$ Edition, a presentation is one or more motion sequences, possibly combined with audio. The track reference box includes one or more track reference type boxes. Each track reference type box is associated with a four-character type identifier and includes a track identifier. The track identifier identifies another track in the presentation. For example, a track reference box of a first track may include a track reference type box associated with the type identifier 'tbas'. In this example, the group identifier in the track reference type box may identify a second track in the presentation. In this example, the first track is said to have a 'tbas' track reference and the second track is said to be identified by the 'tbas' track reference. By including the 'tbas' track reference in the first track, the file indicates that the first track is dependent on the second track. In this example, the second track is the tile base track.

Given the existing file format design described in ISO/IEC FDIS 14496-15:2014, the relationship among sample group entries for tile regions (i.e., rectangular tile regions and unconstrained tile regions), the NALU map entry, and SampleToGroup boxes is not clear. One example of an ambiguity is whether a tile region sample entry ('trif' and/or 'tsif') can be mapped to samples by using a SampleToGroup box. Another example of an ambiguity is whether both a NALU map entry and a SampleToGroup box can be present and associated to a tile region sample entry. The following scenarios (labeled as bullets (A) through (D) below) may help in clarifying the above-listed ambiguities.

(A) There is at most one rectangular tile region in each picture: Where there is at most one rectangular tile region in each picture/sample, the mapping between 'trif' and the sample can be described both by using NALU map entry and SampleToGroup box. When the bitstream carried in the track is a NAL unit based bitstream (e.g., AVC, HEVC, etc.) it may be beneficial or more desirable to use a NALU map entry.

(B) There are multiple rectangular tile regions and one unconstrained tile region in each picture: When there are multiple rectangular tile regions in each picture and they are grouped into one unconstrained tile region, both the NALU map entry and the SampleToGroup box can be used to map the tile regions to the samples. Similar to the above scenario (scenario (A) above), when the bitstream carried in the track is a NAL unit based bitstream (e.g., AVC, HEVC, etc.) it may be beneficial or more desirable to use a NALU map entry. Otherwise, the following technique may be used: at most one SampleToGroup box associated with an unconstrained tile region sample entry is present and no SampleToGroup box associated with a rectangular tile region sample entry is present.

(C) There are multiple rectangular tile regions in each picture and they are not grouped into unconstrained tile region: When there are multiple rectangular tile regions in each picture and they are not grouped into one unconstrained tile region, it is not possible to use SampleToGroup box to map the tile regions to samples. In such situations, although it is possible to use a SampleToGroup box to provide a mapping of one of the rectangular tile regions to samples, such a use-case may not be useful. Rather, the mapping between the tile regions to samples may alternatively (or even should) be done by using a NALU map entry.

(D) There are multiple rectangular tile regions and unconstrained tile regions in each picture: This case is similar to the above case (e.g., the scenario described in bullet (C)), in that or such that the mapping of the tile regions to samples may, or even should, be done by using a NALU map entry.

Based on the above scenarios (A) through (D), it should be clarified when the mapping between tile region sample entries ('trif' and/or 'tsif') and samples should be identified using NALU map entries or tile region sample entries in a SampleToGroup box. For instance, a video coding device may improve operation by implementing a selection scheme with respect to NALU map entry versus tile region sample entries in SampleToGroup boxes, for the mapping.

The existing file format technologies may also give rise to one or more potential issues with respect to the definition of rectangular tile region(s) and/or unconstrained tile region(s). For instance, a rectangular tile region is defined as any integer number of HEVC tiles forming a rectangular region encoded in one or more slices that contain no other HEVC tile and that may be, but need not be, contiguous in decoding order. An unconstrained tile region is defined as any number of complete slices that consist of one or more complete HEVC tiles and may (but need not be) contiguous in decoding order.

Both a rectangular tile region and an unconstrained tile region are defined to be associated with a slice. In the context of HEVC and certain other video coding standards, a slice is defined to be an integer number of CTUs contained in one independent slice segment and all subsequent dependent slice segments (if any) that precede the next independent slice segment (if any) within the same access unit (AU). In other words, a slice may include one or more slice segments (i.e., one independent slice segment with zero or more dependent slice segments).

With the definition of rectangular tile regions and unconstrained tile regions provided above, in the context of HEVC, when a picture is coded with only one slice, even though the slice is made up of multiple slice segments, there can be only at most one rectangular tile region and/or unconstrained tile region. Such a tile region may basically (e.g., substantially) cover the whole picture. The existing file format design is thus limited for such situations when a slice includes or consists of multiple slice segments. In other words, when a slice includes or consists of multiple slice segments containing encoded blocks of multiple tiles, the existing file format design does not all provide a way to specify a rectangular tile region or unconstrained tile region that includes one of the tiles but not the other.

For example, suppose a tile region sample entry is associated with a NALU map entry and the tile region sample entry describes a tile region (e.g., a rectangular tile region or an unconstrained tile region). In this example, the NALU map entry indicates NAL units that are associated with the tile region, such as NAL units containing individual slice segments. Since a tile region is defined in terms of full slices and a slice may include slice segments for blocks outside the tile region, it is unclear in ISO/IEC FDIS 14496-15:2014 whether the NALU map entry should be forced to indicate NAL units for slice segments for blocks outside the tile region, or whether the NALU map entry should only indicate NAL units for slice segments for blocks inside the tile region in tension with the definition of the tile region, or whether the file is permitted to include a tile region sample entry that describes a tile region where a full slice containing blocks of the tile region also contains blocks outside the tile region. As a result of this lack of clarity, different files and devices may be implemented in potentially incompatible ways; or devices may be forced to account for the possibility of files using either interpretation, which may drive up device complexity (and associated costs) and/or slow down the device's ability process files.

The existing file format design may also present one or more potential issues with respect to the presence of the base track for tile tracks. For tile tracks, ISO/IEC 14996-15 specifies the following:

"Neither the samples in the tile track or the sample description box shall contain VPS, SPS or PPS NAL units, these NAL units shall be in the samples or in the sample description box of the track containing the associated layer, as identified by the 'tbas' track reference."

A consequence of the above description is that, when there are one or more tile tracks in a file, the 'tbas' track reference, which is also referred to as a "base tile track," must be present, and each tile track of the file must have a 'tbas' track reference. Such an implicit constraint may be motivated by and/or used to address use cases where the complete picture (i.e., a picture decoded from samples in the base tile track) may need to be decoded and rendered.

In some use cases, the complete picture from the base tile track is never decoded or played. For example, for a virtual reality (VR) video application or a 360-degree video application, only a subset of the entire video region represented by the video pictures, the subset corresponding to the current field of view (FOV), which is also referred to as a "viewport." In other words, the area currently being seen by the user is displayed in these scenarios. U.S. Provisional Application No. 62/339,009 describes an encoding strategy using a scalable video codec, such as SHVC to encode a VR video into multiple resolutions, such as two resolutions. According to this strategy, the entire bitstream of the lowest resolution video (or the base layer) is always transmitted and decoded, whereas at any time only a part of a higher resolution video, which is coded using motion-constrained tiles, is decoded. The higher resolution video bitstreams may be structured to be stored in multiple tile tracks.

For such use cases, requiring that the base tile track always be present may not be needed, and the presence of the base track may in fact be redundant as the base track will never be decoded. For VR video applications, it is envisioned that its file format structure will use many tracks, so it is desirable to only have tracks that are truly useful. However, due to the presence of the tile back track, one more DASH representation is present when the VR video is streamed using DASH. Consequently, the segments of this additional DASH representation may need to be requested, and this consequence may represent an unnecessary burden when parameter sets can actually be stored in the sample entries of the tile tracks, which is often the case.

To address, mitigate, or potentially solve one or more of the above-discussed potential problems, computing devices may implement various techniques of this disclosure, aspects of which are discussed in the paragraphs below. Such computing devices may implement one or more of the techniques individually (e.g., independently) and/or implement two or more of the techniques in various combinations and/or sequences.

In accordance with a first technique of this disclosure, in cases where a tile region sample entry (e.g., a rectangular tile region, unconstrained tile region, or other forms of tile region sample entry) may be mapped to samples by both using a NALU map entry and directly using a SampleToGroup box, a constraint may be implemented such that a tile region sample entry may be associated with a NALU map entry or a SampleToGroup box but not both. Implementing this constraint in a file may eliminate the need for computing devices to be able to handle the possibility of the file including both a NALU map entry associated with a tile region sample entry (e.g., a group description entry of a class having a four-character type identifier of 'trif' or a 'tsif') and a SampleToGroup box associated with the tile region sample entry. This may reduce the complexity of the computing devices.

In accordance with an example of the first technique of this disclosure, a computing device (e.g., source device 12, file generation device 34, or another device) may generate a file conforming to a file format that prevents the device from including in the file both a NALU map entry associated with a tile region sample entry (e.g., a group description entry of a class having a four-character type identifier of 'trif' or a 'tsif') and a SampleToGroup box associated with the tile region sample entry.

In accordance with another example of the first technique of this disclosure, a computing device (e.g., destination device 14, a MANE, or another device) may receive a file. Additionally, in this example, the computing device may determine whether the file includes a NALU map entry associated with a tile region sample entry (e.g., a group description entry of a class having a four-character type identifier of 'trif' or a 'tsif') and whether the file includes a SampleToGroup box associated with a tile region sample entry. In response to determining the file include a NALU map entry associated with a tile region sample entry and a SampleToGroup box associated with a tile region sample entry, the computing device may determine that the file does not conform to a file format. However, the computing device may determine that the file conforms to the file format in response to determining that the file includes either a NALU map entry associated with a tile region sample entry or a SampleToGroup box associated with a tile region sample entry, but not both.

In some examples, file generation device 34 may determine whether the tile region sample entry (e.g., a group description entry of a class having a four-character type identifier of 'trif' or a 'tsif') can be mapped to samples using both the NALU map entry and the SampleToGroup box. If the determination is positive (i.e. the tile region sample entry can be mapped to the sample(s) using both), then file generation device 34 may constrain the mapping such that the tile region sample entry can only be mapped to the sample(s) using one of the NALU map entry or the SampleToGroup box, but cannot be mapped to the sample(s) using any combination of the NALU map entry and the SampleToGroup box. Thus, in this example, a computing device may determine that a tile region sample entry is associated with either a NALU map entry or a SampleToGroup box. Furthermore, the computing device may determine that the tile region sample entry is not associated with a combination of the NALU map entry and the SampleToGroup box.

In accordance with a second technique of this disclosure, when tile region sample entries are associated with a SampleToGroup box, there shall be only one tile region (either one tile region or a set of tile regions that are grouped together to form a bigger region) present in a sample. In other words, when a sample table box of a file includes tile region sample entries associated with a SampleToGroup box, a restriction present in a file format of the file prevents a sample of the file from including coded slice NAL units for multiple tiles regions. This restriction may reduce the complexity of computing devices reading the file because the computing devices do not need to account for the possibility that a sample of the file includes coded slice NAL units for multiple tile regions. Reducing such complexity may accelerate the operation of the devices, may reduce costs of the computing devices, or may otherwise improve the computing devices.

In accordance with an example of the second technique of this disclosure, a computing device (e.g., source device 12, file generation device 34, or another device) may generate a file conforming to a file format that prevents the computing device from generating a file that includes a tile region sample entry associated with a SampleToGroup box and a sample in which two or more tile regions are present.

In accordance with another example of the second technique of this disclosure, a computing device (e.g., destination device 14, a MANE, or another device) may receive a file. Additionally, in this example, the computing device may determine whether the file includes a tile region sample entry associated with a SampleToGroup box of the file and whether two or more tile regions are present in a single sample of the file. In response to determining that the file includes a tile region sample entry associated with a SampleToGroup box of the file and two or more tile regions are present in a single sample of the file, the computing device may determine that the file does not conform to a file format. Conversely, the computing device may determine the file conforms to the file format in response to determining that the file includes a tile region sample entry associated with a SampleToGroup box of the file and, for each respective sample of the file, only a single tile region is present in the respective file.

In some examples, a computing device may determine that a tile region sample entry is associated with a SampleToGroup box. In this example, the computing device may determine that a sample that is mapped to the tile region sample entry includes exactly one tile region or a consolidated region that includes two or more tile regions. For instance, the computing device (e.g., destination device 14, a computing device that includes video encoder 20 and/or video decoder 30, or another type of device) may determine that tile region sample entries (e.g., a 'trif' or a 'tsif') are mapped to the corresponding sample(s) using a SampleToGroup box. If the determination is positive (i.e., the trif or tsif, as the case may be, is mapped to the sample(s) using the SampleToGroup box), then the computing device may constrain the tile-sample interaction such that only one tile region is present in a given sample.

In accordance with a third technique of this disclosure, a signalling may be implemented to indicate whether mapping of tile regions and samples uses a NALU map entry or directly uses a sample to group box. For instance, file generation device 34 or another device may implement the signalling to indicate whether mapping of tile regions and samples uses NALU map entry, or directly uses a SampleToGroup box. For instance, file generation device 34 may encode and signal information that indicates whether a tile region-to-sample mapping uses a NALU map entry, or uses a sample-to-group box. In turn, file generation device 34 may use the signaled information to determine whether a tile region-to-sample mapping uses a NALU map entry, or uses a sample-to-group box. Two example implementations are described below.

In a first example implementation of the third technique, a version field of the sample group description box ('sgpd') that contains the tile region sample entries can be used to indicate whether the tile region sample entries may be associated with a NALU map entry or a SampleToGroup box. In other words, a computing device may use the version syntax element of a SampleGroupDescription box to determine whether a tile region sample entry in the SampleGroupDescription box is associated with a NALU map entry or with a SampleToGroup box. For example, when the version syntax element of the SampleGroupDescription box ('sgpd') is equal to 0, the tile region sample entries in the SampleGroupDescription box are associated with a SampleToGroup box, not a NALU map entry, and when the version syntax element of the SampleGroupDescription box ('sgpd') is equal to 1, the tile region sample entries in the SampleGroupDescription box are associated with a NALU map entry, not a SampleToGroup box. Hence, in this example, if the version syntax element of the SampleGroupDescription box is 0, a computing device may determine that a tile region sample entry in the SampleGroupDescription box is associated with the SampleToGroup box. If the version syntax element is 1, the computing device may determine that the tile region sample entry in the SampleGroupDescription box is associated with the NALU map entry.

For instance, a first device (e.g., source device 12, file generation device 34) may signal a 0 value in the version syntax element of the SampleGroupDescription box ('sgpd') to indicate that tile region sample entries in the SampleGroupDescription box (e.g., 'trif' or 'tsif', as the case may be) are mapped to sample(s) using a SampleToGroup box. In turn, a second device (e.g., destination device 14) may use the zero value in the version syntax element of the SampleGroupDescription box ('sgpd') to determine that the tile region sample entries in the SampleGroupDescription box ('trif' or 'tsif', as the case may be) are mapped to the sample(s) using a SampleToGroup box. Conversely, the first device may encode and signal a 1 value in the version syntax element of the SampleGroupDescription box ('sgpd') to indicate that the tile region sample entries in the SampleGroupDescription box ('trif' or 'tsif', as the case may be) are mapped to the sample(s) using a NALU map entry. In turn, in this example, the second device may use the 0 value in the version syntax element of the SampleGroupDescription box to determine that the tile region sample entries in the SampleGroupDescription box (e.g., 'trif' or 'tsif', as the case may be) are mapped to the sample(s) using a NALU map entry.

In a second example implementation of the third technique, a flag may be added in each tile region sample entry to indicate whether the tile region sample entry is associated with a SampleToGroup box or a NALU map entry. Hence, in this example, a computing device may use a one-bit flag to determine whether a tile region sample entry is associated with a NALU map entry or with a SampleToGroup box. For instance, a first device (e.g., source device 12, file generation device 34, or another device) may use one possible binary value of a one-bit flag to indicate that a tile region sample entry (e.g., 'trif' or 'tsif') is mapped to the sample(s) using a NALU map entry, and use the other possible binary value of the one-bit flag to indicate that the tile region sample entry is mapped to the sample(s) using a SampleToGroup box. In turn, a second device (e.g., destination device 14, a MANE, or another device) may reconstruct the signaled one-bit flag. If the flag is set to a first possible binary value, the second device may determine that the tile region sample entry (e.g., 'trif' or 'tsif') is mapped to the sample(s) using a NALU map entry. If the flag is set to a second possible binary value, the second device may determine that the tile region sample entry is mapped to the sample(s) using a SampleToGroup box In accordance with a fourth technique of this disclosure, when a bitstream in a track is NAL unit based (e.g., AVC, HEVC, derivations of AVC or HEVC, etc.), tile region sample entries should be associated with a NALU map entry, not a SampleToGroup box. For example, a first device (e.g., source device 12, file generation device 34, or another device) may determine whether a bitstream is NAL unit based, such as a bitstream that conforms to one of the AVC or HEVC standards, or standards that are derivations thereof. Based on the determination that the bitstream is NAL unit-based, the first device may generate a file storing the bitstream such that one or more tile region sample entries in the file is associated with a NALU map entry and no tile region sample entry in the file is associated with a SampleToGroup box. However, based on the determination that the bitstream is not NAL unit based, the first device may generate the file such that a tile region sample entry is associated with a SampleToGroup box. In some examples, a second device (e.g., destination device 14) may determine that the file does not conform to a file format when the file stores a bitstream that is NAL unit based and includes a tile region sample entry associated with a SampleToGroup box.

Thus, in the fourth example, a computing device may determine that a tile region is included in a NAL unit-based bitstream. Additionally, in this example, the computing device may determine that a tile region sample entry of the NAL unit-based bitstream is associated with a NALU map entry.

In accordance with a fifth technique of this disclosure, for HEVC and its derivative codecs (e.g., SHVC, MV-HEVC, HEVC-SCC, etc.), definitions of rectangular tile region and unconstrained tile region are changed such that instead of at slice level, they are defined at a slice segment level. Two examples of the fifth technique of this disclosure are discussed under sub-bullets (a) and (b) below.
  a) Rectangular tile region is defined as any integer number of HEVC tiles forming a rectangular region encoded in one or more slice segments that contain no other HEVC tile and that may (but need not be) contiguous in decoding order.
  b) Unconstrained tile region is defined as any number of slice segments that include of one or more complete HEVC tiles and may (but need not be) contiguous in decoding order.

As a result of changing the definitions of rectangular tile region and unconstrained tile region in this manner, file generation device 34 may generate files in which a NALU map entry associated with a tile region specifies coded slice NAL units that include encoded blocks of the tile region and does not specify coded slice NAL units that do not include encoded blocks outside the tile region. For example, suppose NAL units 1 through 10 are coded slice NAL units that include encoded blocks inside a tile region and let NAL units 11 through 20 be coded slice NAL units that include encoded blocks outside the tile region. Furthermore, in this example, suppose NAL unit 1 comprises an independent slice segment and NAL unit 15 contains the next independent slice segment. Thus, in this example, NAL units 1 through 14 correspond to a first full slice and NAL units 15 onward correspond to a second full slice. Additionally, in this example, suppose the group identifier (e.g., groupID) of a tile region entry for the tile region is equal to 55. In this example, a NALU map entry associated with the tile region sample entry for the tile region may include two entries. In accordance with the fifth technique of this disclosure, because the tile region is defined in terms of slice segments instead of full slices, the first entry in the NALU map entry specifies a NALU_start_number of 1 and a groupID of 55; the second entry in the NALU map entry specifies a NALU_start_number of 11 and a groupID equal to some number other than 55. In contrast, had the tile region been defined in terms of full slices, the second entry in the NALU map entry may have been forced to specify 15 instead of 11 so that the tile region includes the full first slice.

Thus, in some examples, a rectangular tile region may comprise an integer number of tiles that collectively form a rectangular region in a slice segment of the video data. In some examples, the slice segment does not include any tile other than the tiles that collectively form the rectangular region. In some examples, the tiles that collectively form a rectangular tile region are arranged in contiguous order. Furthermore, in some examples, the tiles that collectively form the rectangular tile region are arranged in a non-contiguous order.

In some examples, a tile region may comprise an unconstrained tile region. The unconstrained tile region comprising an integer number of tiles in a slice segment of the video data. Furthermore, in some examples, the tiles of the unconstrained tile region are arranged in contiguous order. In some examples, the tiles that of the unconstrained tile region are arranged in a non-contiguous order. In some examples, the slice segment does not include any tile other than the tiles of the unconstrained region.

In accordance with the fifth technique of this disclosure, a computing device (e.g., source device 12, file generation device 34, a MANE, or another computing device) receives a bitstream comprising a stream of NAL units. The stream of NAL units comprises a plurality of coded slice NAL units. Each respective coded slice NAL unit of the plurality of coded slice NAL units encapsulates a respective RBSP for a respective slice segment of a plurality of slice segments of a slice of a picture of the video data. Each respective slice segment of the plurality of slice segments of the slice comprises an integer number of CTUs of the picture. The plurality of slice segments of the slice includes an independent slice segment and one or more dependent slice segments. Furthermore, in this example, the picture is partitioned into a plurality of tiles, the plurality of tiles including a first tile and a second tile. The plurality of slice segments of the slice includes one or more slice segments that contain CTUs of the first tile and the plurality of slice segments of the slice includes one or more slice segments that contain CTUs of the second tile.

Furthermore, in this example, the computing device may generate a file storing the bitstream. As part of generating the file, the computing device may define a tile region in the file. The tile region is a rectangular tile region that comprises an integer number of tiles of the plurality of tiles forming a rectangular region encoded in one or more of the slice segments. In some examples, the rectangular tile region does not contain any tile other than the integer number of tiles forming the rectangular region. The rectangular tile region includes the first tile, the rectangular tile region not including the second tile. Thus, in this example, the tile region is not forced to include the second tile because the CTUs of the second tile are in the same full slices as blocks of the first tile.

Similarly, in one example, a computing device may receive a file that stores a bitstream. In this example, the bitstream comprises a stream of NAL units. The stream of NAL units comprises a plurality of coded slice NAL units. Each respective coded slice NAL unit of the plurality of coded slice NAL units encapsulates a respective RBSP for a respective slice segment of a plurality of slice segments of a slice of a picture of the video data. Each respective slice segment of the plurality of slice segments of the slice comprises an integer number of CTUs of the picture. The plurality of slice segments of the slice includes an independent slice segment and one or more dependent slice segments. In this example, the picture is partitioned into a plurality of tiles, including a first tile and a second tile. The plurality of slice segments of the slice includes one or more slice segments that contain CTUs of the first tile and the plurality of slice segments of the slice includes one or more slice segments that contain CTUs of the second tile. A tile region is defined in the file. The tile region is a rectangular tile region that comprises an integer number of tiles of the plurality of tiles forming a rectangular region encoded in one or more of the slice segments. In some examples, the rectangular tile region does not contain any tile other than the integer number of tiles forming the rectangular region. The rectangular tile region includes the first tile, but the rectangular tile region does not include the second tile. In this example, the computing device may use the file for local media file playback, progressive downloading of data in the file to a remote device, or other uses.

In accordance with a sixth technique of this disclosure, tile tracks may or may not have 'tbas' track references. In other words, a track box for a tile track may include, but is not required to include, a track reference box that includes a track reference type box associated with the type identifier 'tbas.' In accordance with the sixth technique, when a tile track has a 'tbas' track reference, neither the samples nor the sample description box in the tile track shall contain VPS, SPS or PPS NAL units. Rather, these NAL units (i.e., VPS, SPS, and PPS NAL units) shall be in the samples or in the sample description box of the 'tbas' track reference. In other words, the VPS NAL units, SPS NAL units, and PPS NAL units needed for decoding the tile track reference are stored in samples of or the sample description box of the track indicated by the track identifier in the 'tbas' track reference type box in the track reference box of the tile track.

However, in accordance with the sixth technique, when a tile track does not have a 'tbas' track reference, necessary non-VCL NAL units (e.g., parameter set NAL units such as VPS, SPS, PPS and SEI NAL units) shall be either in the samples of the tile track or in the sample description box of the tile track, with a preferential positioning only in the sample description boxes whenever possible. For example, file generation device 34 may include the non-VCL NAL units in the sample description box of the tile track when there is no parameter set update, where parameter set NAL unit content is not changed at all except the ID of the parameter set itself, and so on. In this way, the file format has flexibility whether to use a tile base track. As described above, in some circumstances, the use of the tile base track may be detrimental to computer performance.

Thus, in one example of the sixth technique, a computing device may determine whether a tile track of the video data is associated with a base track (tbas) reference. In some instances of the sixth technique, responsive to a determination that the tile track is associated with a 'tbas' reference, the computing device may determine that parameter set NAL units for the tile track are included in samples or a sample description box of the base tile track. In some instances of the sixth example, responsive to a determination that the tile track is associated with a 'tbas' reference, the computing device may determine that no parameter set NAL unit for the tile track is included in any sample or sample description box of the tile track. In some instances of the sixth technique, responsive to a determination that the tile track is not associated with any 'tbas' reference, the computing device may determine that one or more parameter set NAL units for the tile track are included in either a sample description box or in one or more samples of the tile track. In some instances of the sixth example, responsive to the determination that the tile track is not associated with any 'tbas' reference, the computing device may determine that all parameter set NAL units for the tile track are included in exactly one of a sample description or in one or more samples of the tile track. In some instances of the sixth technique, the parameter set NAL units comprise one or more of VPS, SPS, or PPS NAL units.

In accordance with a seventh technique of this disclosure, when a tile track does not have the 'tbas' track reference, all tile tracks that are part of the same bitstream shall also not have the 'tbas' track reference. For example, file generation device 34 may generate a file such that the file includes a plurality of tile tracks. In this example, none of the tile tracks has a 'tbas' track reference. Moreover, in some examples, a computing device (e.g., destination device 14, a MANE, or another device) may determine that a file includes a first tile track that does not have a 'tbas' track reference. Based on the first tile track not including a 'tbas' track reference, the computing device may determine that no other tile track of the file (that also includes the file tile track) includes a 'tbas' track reference.

In accordance with an eighth technique of this disclosure, when a tile track has a 'tbas' track reference, all tile tracks that are part of the same bitstream shall also have the 'tbas' track reference. For example, file generation device 34 may generate a file such that the file includes a plurality of tile tracks. In this example, a constraint specified by a file format of the file requires each tile track of the file to have a 'tbas' reference if any tile track of the file has a 'tbas' reference. In some examples, a computing device (e.g., destination device 14, a MANE, or another device) may determine that a file includes a first tile track that has a 'tbas' track reference. In this example, the file stores a metadata regarding a bitstream. Based on the first tile track including the 'tbas' track reference, the computing device may determine that every other tile track of the file includes a respective 'tbas' track reference.

In accordance with a ninth technique of this disclosure, when more than one tile tracks is decoded, for non-VCL NAL units that are duplicated, only one copy shall be kept and the rest are removed. For instance, a computing device (e.g., destination device 14, a MANE, video decoder 30, or another device) may reconstruct data of a received bitstream, and determine that the reconstructed data includes duplicate non-VCL NAL units. Based on the detected duplication, the computing device may retain one copy of the non-VCL NAL units that show duplication or redundancy. Additionally, the computing device may discard all other (e.g., duplicate or redundant) copies of the non-VCL NAL unit(s) for which duplication is detected.

Figure 3:
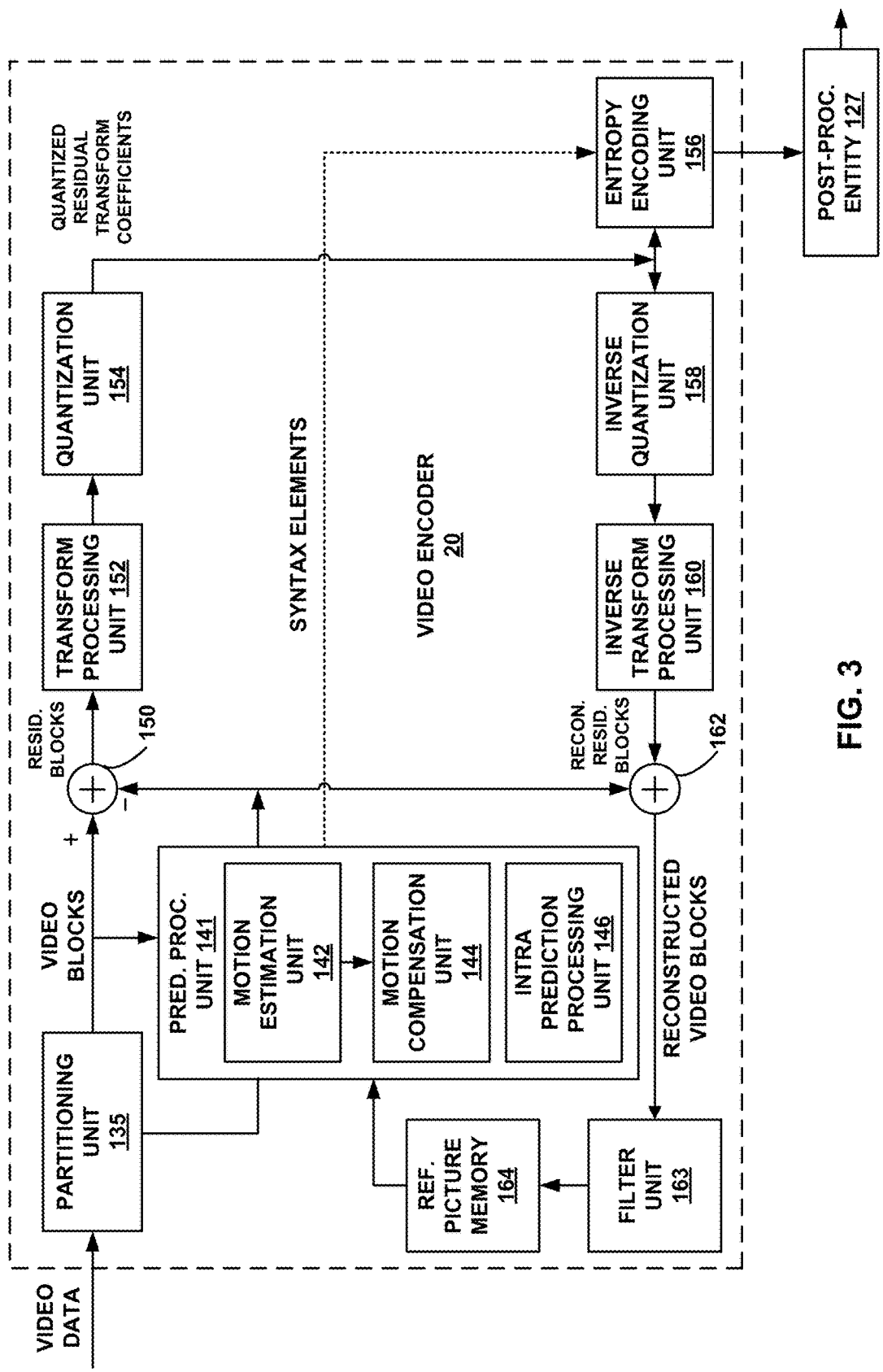
FIG. 3 is a block diagram illustrating an example video encoder that may be used with the techniques described in this disclosure.

FIG. 3 is a block diagram illustrating an example video encoder 20 that may be used with the techniques described in this disclosure. Video encoder 20 may be configured to output single view, multiview, scalable, 3D, and other types of video data. Video encoder 20 may be configured to output video to post-processing entity 27. Post-processing entity 27 is intended to represent an example of a video entity, such as a MANE or splicing/editing device, that may process encoded video data from video encoder 20. In some instances, post-processing entity may be an example of a network entity. In some video encoding systems, post-processing entity 27 and video encoder 20 may be parts of separate devices, while in other instances, the functionality described with respect to post-processing entity 27 may be performed by the same device that comprises video encoder 20. Post-processing entity 27 may be a video device. In some examples, post-processing entity 27 may be the same as file generation device 34 of FIG. 1.

Video encoder 20 may perform intra- and inter-coding of video blocks within video slices. Intra-coding relies on spatial prediction to reduce or remove spatial redundancy in video within a given video frame or picture. Inter-coding relies on temporal prediction to reduce or remove temporal redundancy in video within adjacent frames or pictures of a video sequence. Intra-mode (I mode) may refer to any of several spatial based compression modes. Inter-modes, such as uni-directional prediction (P mode) or bi-prediction (B mode), may refer to any of several temporal-based compression modes.

In the example of FIG. 3, video encoder 20 includes a partitioning unit 135, prediction processing unit 141, filter unit 163, reference picture memory 164, summer 150, transform processing unit 152, quantization unit 154, and entropy encoding unit 156. Prediction processing unit 141 includes motion estimation unit 142, motion compensation unit 144, and intra prediction processing unit 146. For video block reconstruction, video encoder 20 also includes inverse quantization unit 158, inverse transform processing unit 160, and summer 162. Filter unit 163 is intended to represent one or more loop filters such as a deblocking filter, an adaptive loop filter (ALF), and a sample adaptive offset (SAO) filter. Although filter unit 163 is shown in FIG. 3 as being an in-loop filter, in other configurations, filter unit 163 may be implemented as a post loop filter.

A video data memory of video encoder 20 may store video data to be encoded by the components of video encoder 20. The video data stored in the video data memory may be obtained, for example, from video source 18. Reference picture memory 164 may be a reference picture memory that stores reference video data for use in encoding video data by video encoder 20, e.g., in intra- or inter-coding modes. The video data memory and reference picture memory 164 may be formed by any of a variety of memory devices, such as dynamic random access memory (DRAM), including synchronous DRAM (SDRAM), magnetoresistive RAM (MRAM), resistive RAM (RRAM), or other types of memory devices. The video data memory and reference picture memory 164 may be provided by the same memory device or separate memory devices. In various examples, the video data memory may be on-chip with other components of video encoder 20, or off-chip relative to those components.

As shown in FIG. 3, video encoder 20 receives video data, and partitioning unit 135 partitions the data into video blocks. This partitioning may also include partitioning into slices, tiles, or other larger units, as wells as video block partitioning, e.g., according to a quadtree structure of LCUs and CUs. Video encoder 20 generally illustrates the components that encode video blocks within a video slice to be encoded. The slice may be divided into multiple video blocks (and possibly into sets of video blocks referred to as tiles). Prediction processing unit 141 may select one of a plurality of possible coding modes, such as one of a plurality of intra coding modes or one of a plurality of inter coding modes, for the current video block based on error results (e.g., coding rate and the level of distortion). Prediction processing unit 141 may provide the resulting intra- or inter-coded block to summer 150 to generate residual block data and to summer 162 to reconstruct the encoded block for use as a reference picture.

Intra prediction processing unit 146 within prediction processing unit 141 may perform intra-predictive coding of the current video block relative to one or more neighboring blocks in the same frame or slice as the current block to be coded to provide spatial compression. Motion estimation unit 142 and motion compensation unit 144 within prediction processing unit 141 perform inter-predictive coding of the current video block relative to one or more predictive blocks in one or more reference pictures to provide temporal compression.

Motion estimation unit 142 may be configured to determine the inter-prediction mode for a video slice according to a predetermined pattern for a video sequence. The predetermined pattern may designate video slices in the sequence as P slices, B slices or GPB slices. Motion estimation, performed by motion estimation unit 142, is the process of generating motion vectors, which estimate motion for video blocks. A motion vector, for example, may indicate the displacement of a PU of a video block within a current video frame or picture relative to a predictive block within a reference picture.

A predictive block is a block that is found to closely match the PU of the video block to be coded in terms of pixel difference, which may be determined by sum of absolute difference (SAD), sum of square difference (SSD), or other difference metrics. In some examples, video encoder 20 may calculate values for sub-integer pixel positions of reference pictures stored in reference picture memory 164. Therefore, motion estimation unit 142 may perform a motion search relative to the full pixel positions and fractional pixel positions and output a motion vector with fractional pixel precision.

Motion estimation unit 142 calculates a motion vector for a PU of a video block in an inter-coded slice by comparing the position of the PU to the position of a predictive block of a reference picture. The reference picture may be selected from a first reference picture list (List 0) or a second reference picture list (List 1), each of which identify one or more reference pictures stored in reference picture memory 164. Motion estimation unit 142 sends the calculated motion vector to entropy encoding unit 156 and motion compensation unit 144.

Motion compensation, performed by motion compensation unit 144, may involve fetching or generating the predictive block based on the motion vector determined by motion estimation, possibly performing interpolations to sub-pixel precision. Upon receiving the motion vector for the PU of the current video block, motion compensation unit 144 may locate the predictive block to which the motion vector points in one of the reference picture lists. Video encoder 20 may form a residual video block by subtracting pixel values of the predictive block from the pixel values of the current video block being coded, forming pixel difference values. The pixel difference values form residual data for the block, and may include both luma and chroma difference components. Summer 150 represents the component or components that perform this subtraction operation. Motion compensation unit 144 may also generate syntax elements associated with the video blocks and the video slice for use by video decoder 30 in decoding the video blocks of the video slice.

Intra prediction processing unit 146 may intra-predict a current block, as an alternative to the inter-prediction performed by motion estimation unit 142 and motion compensation unit 144, as described above. In particular, intra prediction processing unit 146 may determine an intra-prediction mode to use to encode a current block. In some examples, intra prediction processing unit 146 may encode a current block using various intra-prediction modes, e.g., during separate encoding passes, and intra prediction processing unit 146 may select an appropriate intra-prediction mode to use from the tested modes. For example, intra prediction processing unit 146 may calculate rate-distortion values using a rate-distortion analysis for the various tested intra-prediction modes, and select the intra-prediction mode having the best rate-distortion characteristics among the tested modes. Rate-distortion analysis generally determines an amount of distortion (or error) between an encoded block and an original, unencoded block that was encoded to produce the encoded block, as well as a bit rate (that is, a number of bits) used to produce the encoded block. Intra prediction processing unit 146 may calculate ratios from the distortions and rates for the various encoded blocks to determine which intra-prediction mode exhibits the best rate-distortion value for the block.

In any case, after selecting an intra-prediction mode for a block, intra prediction processing unit 146 may provide information indicative of the selected intra-prediction mode for the block to entropy encoding unit 156. Entropy encoding unit 156 may encode the information indicating the selected intra-prediction mode in accordance with the techniques of this disclosure. Video encoder 20 may include in the transmitted bitstream configuration data, which may include a plurality of intra-prediction mode index tables and a plurality of modified intra-prediction mode index tables (also referred to as codeword mapping tables), definitions of encoding contexts for various blocks, and indications of a most probable intra-prediction mode, an intra-prediction mode index table, and a modified intra-prediction mode index table to use for each of the contexts.

After prediction processing unit 141 generates the predictive block for the current video block via either inter-prediction or intra-prediction, video encoder 20 may form a residual video block by subtracting the predictive block from the current video block. The residual video data in the residual block may be included in one or more TUs and applied to transform processing unit 152. Transform processing unit 152 transforms the residual video data into residual transform coefficients using a transform, such as a discrete cosine transform (DCT) or a conceptually similar transform. Transform processing unit 152 may convert the residual video data from a pixel domain to a transform domain, such as a frequency domain.

Transform processing unit 152 may send the resulting transform coefficients to quantization unit 154. Quantization unit 154 quantizes the transform coefficients to further reduce bit rate. The quantization process may reduce the bit depth associated with some or all of the coefficients. The degree of quantization may be modified by adjusting a quantization parameter. In some examples, quantization unit 154 may then perform a scan of the matrix including the quantized transform coefficients. Alternatively, entropy encoding unit 156 may perform the scan.

Following quantization, entropy encoding unit 156 may entropy encode syntax elements representing the quantized transform coefficients. For example, entropy encoding unit 156 may perform context adaptive variable length coding (CAVLC), context adaptive binary arithmetic coding (CABAC), syntax-based context-adaptive binary arithmetic coding (SBAC), probability interval partitioning entropy (PIPE) coding or another entropy encoding methodology or technique. Following the entropy encoding by entropy encoding unit 156, the encoded bitstream may be transmitted to video decoder 30, or archived for later transmission or retrieval by video decoder 30. Entropy encoding unit 156 may also entropy encode the motion vectors and the other syntax elements for the current video slice being coded.

Inverse quantization unit 158 and inverse transform processing unit 160 apply inverse quantization and inverse transformation, respectively, to reconstruct the residual block in the pixel domain for later use as a reference block of a reference picture. Motion compensation unit 144 may calculate a reference block by adding the residual block to a predictive block of one of the reference pictures within one of the reference picture lists. Motion compensation unit 144 may also apply one or more interpolation filters to the reconstructed residual block to calculate sub-integer pixel values for use in motion estimation. Summer 162 adds the reconstructed residual block to the motion compensated prediction block produced by motion compensation unit 144 to produce a reference block for storage in reference picture memory 164. The reference block may be used by motion estimation unit 142 and motion compensation unit 144 as a reference block to inter-predict a block in a subsequent video frame or picture.

Video encoder 20 represents an example of a video coder configured generate video data that may be stored using the file format techniques described in this disclosure.

Figure 4:
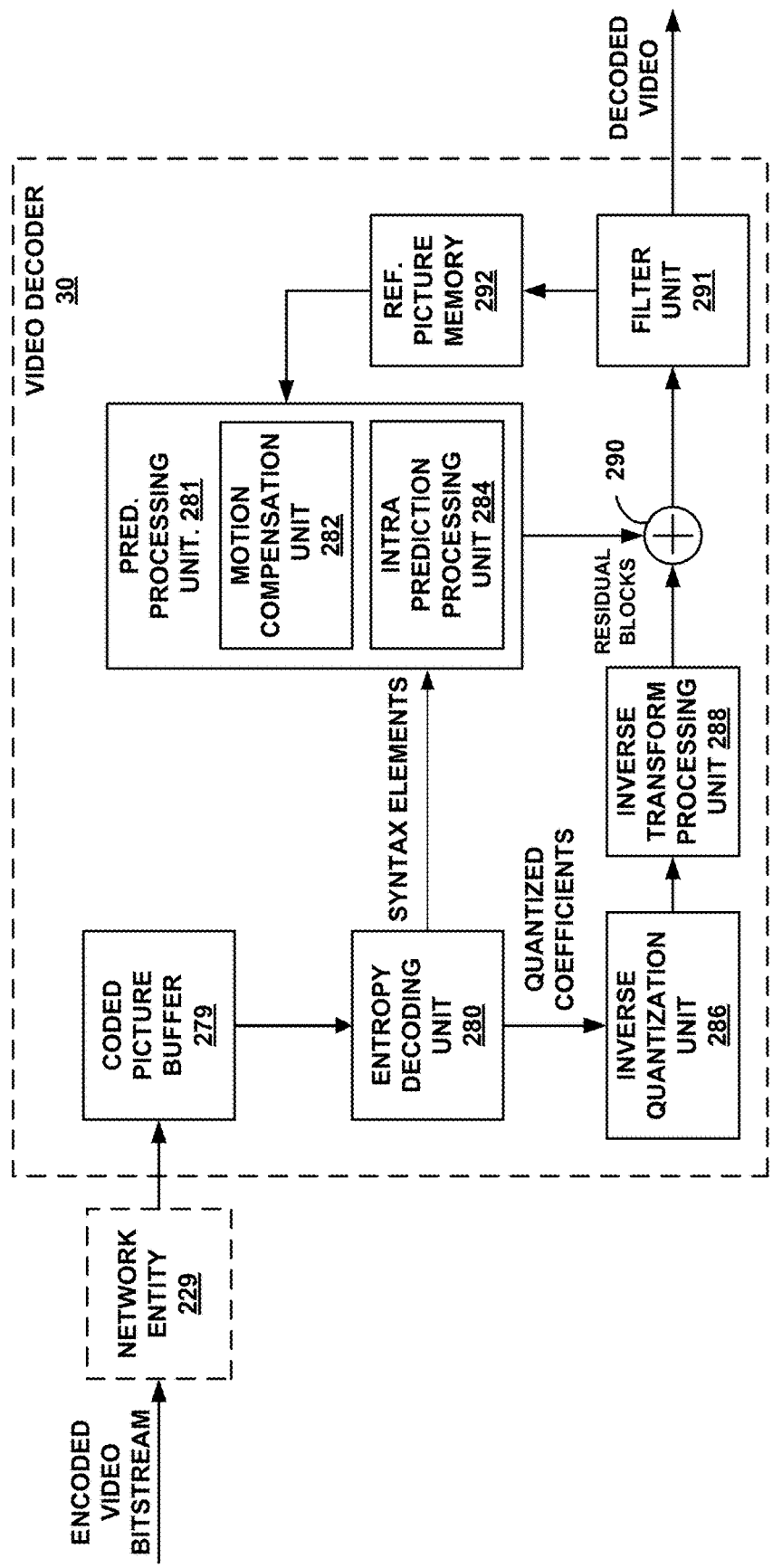
FIG. 4 is a block diagram illustrating an example video decoder that may be used with the techniques described in this disclosure.

FIG. 4 is a block diagram illustrating an example video decoder 30 that may be used with the techniques described in this disclosure. Video decoder 30 may be configured to decode single view, multiview, scalable, 3D, and other types of video data. In the example of FIG. 4, video decoder 30 includes an entropy decoding unit 280, prediction processing unit 281, inverse quantization unit 286, inverse transform processing unit 288, summer 290, filter unit 291, and reference picture memory 292. Prediction processing unit 281 includes motion compensation unit 282 and intra prediction processing unit 284. Video decoder 30 may, in some examples, perform a decoding pass generally reciprocal to the encoding pass described with respect to video encoder 20 from FIG. 3.

A coded picture buffer (CPB) 279 may receive and store encoded video data (e.g., NAL units) of a bitstream. The video data stored in CPB 279 may be obtained, for example, from link 16, e.g., from a local video source, such as a camera, via wired or wireless network communication of video data, or by accessing physical data storage media. CPB 279 may form a video data memory that stores encoded video data from an encoded video bitstream. CPB 279 may be a reference picture memory that stores reference video data for use in decoding video data by video decoder 30, e.g., in intra- or inter-coding modes. CPB 279 and reference picture memory 292 may be formed by any of a variety of memory devices, such as dynamic random access memory (DRAM), including synchronous DRAM (SDRAM), magnetoresistive RAM (MRAM), resistive RAM (RRAM), or other types of memory devices. CPB 279 and reference picture memory 292 may be provided by the same memory device or separate memory devices. In various examples, CPB 279 may be on-chip with other components of video decoder 30, or off-chip relative to those components.

During the decoding process, video decoder 30 receives an encoded video bitstream that represents video blocks of an encoded video slice and associated syntax elements from video encoder 20. Video decoder 30 may receive the encoded video bitstream from network entity 229. Network entity 229 may, for example, be a server, a MANE, a video editor/splicer, or other such device configured to implement one or more of the techniques described above. Network entity 229 may or may not include a video encoder, such as video encoder 20. Some of the techniques described in this disclosure may be implemented by network entity 229 prior to network entity 229 transmitting the encoded video bitstream to video decoder 30. In some video decoding systems, network entity 229 and video decoder 30 may be parts of separate devices, while in other instances, the functionality described with respect to network entity 229 may be performed by the same device that comprises video decoder 30. Network entity 229 may be considered to be a video device. Furthermore, in some examples, network entity 229 is the file generation device 34 of FIG. 1.

Entropy decoding unit 280 of video decoder 30 entropy decodes particular syntax elements of the bitstream to generate quantized coefficients, motion vectors, and other syntax elements. Entropy decoding unit 280 forwards the motion vectors and other syntax elements to prediction processing unit 281. Video decoder 30 may receive the syntax elements at the video slice level and/or the video block level.

Intra prediction processing unit 284 of prediction processing unit 281 may generate prediction data for a video block of the current video slice based on a signaled intra prediction mode and data from previously decoded blocks of the current frame or picture. Motion compensation unit 282 of prediction processing unit 281 produces predictive blocks for a video block of the current video slice based on the motion vectors and other syntax elements received from entropy decoding unit 280. The predictive blocks may be produced from one of the reference pictures within one of the reference picture lists. Video decoder 30 may construct the reference frame lists, List 0 and List 1, using default construction techniques based on reference pictures stored in reference picture memory 292.

Inverse quantization unit 286 inverse quantizes, i.e., dequantizes, the quantized transform coefficients provided in the bitstream and decoded by entropy decoding unit 280. Inverse transform processing unit 288 applies an inverse transform, e.g., an inverse DCT, an inverse integer transform, or a conceptually similar inverse transform process, to the transform coefficients in order to produce residual blocks in the pixel domain.

After motion compensation unit 282 generates the predictive block for the current video block based on the motion vectors and other syntax elements, video decoder 30 forms a decoded video block by summing the residual blocks from inverse transform processing unit 288 with the corresponding predictive blocks generated by motion compensation unit 282. Summer 290 represents the component or components that perform this summation operation. If desired, loop filters (either in the coding loop or after the coding loop) may also be used to smooth pixel transitions, or otherwise improve the video quality. Filter unit 291 is intended to represent one or more loop filters such as a deblocking filter, an adaptive loop filter (ALF), and a sample adaptive offset (SAO) filter. Although filter unit 291 is shown in FIG. 4 as being an in loop filter, in other configurations, filter unit 291 may be implemented as a post loop filter. The decoded video blocks in a given frame or picture are then stored in reference picture memory 292, which stores reference pictures used for subsequent motion compensation. Reference picture memory 292 also stores decoded video for later presentation on a display device, such as display device 32 of FIG. 1.

Video decoder 30 of FIG. 4 represents an example of a video decoder configured to decode video data that may be stored using the file format techniques described in this disclosure.

Figure 5:
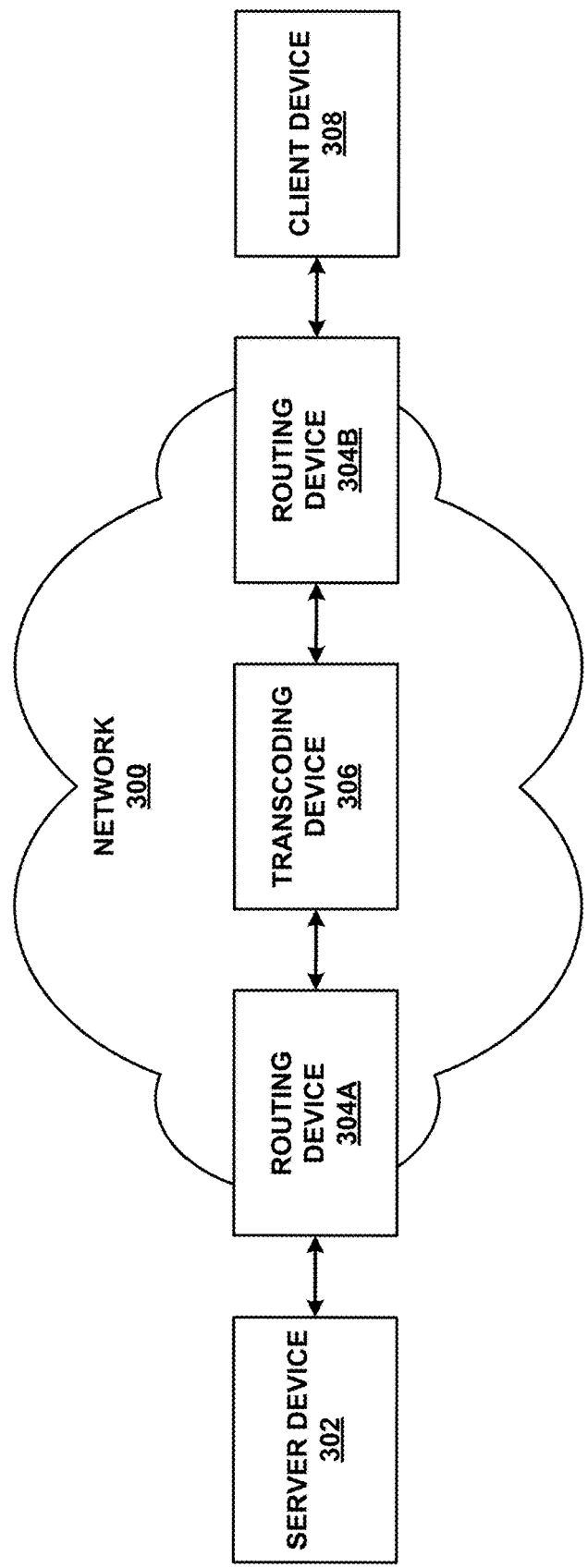
FIG. 5 is a block diagram illustrating an example set of devices that form part of a network.

FIG. 5 is a block diagram illustrating an example set of devices that form part of network 300. In this example, network 300 includes routing devices 304A, 304B (routing devices 304) and transcoding device 306. Routing devices 304 and transcoding device 306 are intended to represent a small number of devices that may form part of network 300. Other network devices, such as switches, hubs, gateways, firewalls, bridges, and other such devices may also be included within network 300. Moreover, additional network devices may be provided along a network path between server device 302 and client device 308. Server device 302 may correspond to source device 12 (FIG. 1), while client device 308 may correspond to destination device 14 (FIG. 1), in some examples.

In general, routing devices 304 implement one or more routing protocols to exchange network data through network 300. In some examples, routing devices 304 may be configured to perform proxy or cache operations. Therefore, in some examples, routing devices 304 may be referred to as proxy devices. In general, routing devices 304 execute routing protocols to discover routes through network 300. By executing such routing protocols, routing device 304B may discover a network route from itself to server device 302 via routing device 304A.

The techniques of this disclosure may be implemented by network devices such routing devices 304 and transcoding device 306, but also may be implemented by client device 308. In this manner, routing devices 304, transcoding device 306, and client device 308 represent examples of devices configured to perform the techniques of this disclosure. Moreover, the devices of FIG. 1, and video encoder 20 illustrated in FIG. 3 and video decoder 30 illustrated in FIG. 4 are also examples of devices that can be configured to perform one or more of the techniques of this disclosure.

FIG. 6 is a conceptual diagram illustrating an example structure of a file 400, in accordance with one or more techniques of this disclosure. In the example of FIG. 6, file 400 includes a movie box 402 and a plurality of media data boxes 404. Although illustrated in the example of FIG. 6 as being in the same file, in other examples, movie box 402 and media data boxes 404 may be in separate files. As indicated above, a box may be an object-oriented building block defined by a unique type identifier and length. For instance, a box may be the elementary syntax structure in the ISOBMFF, including a four-character coded box type, a byte count of the box, and a payload.

Movie box 402 may contain metadata for tracks of file 400. Each track of file 400 may comprise a continuous stream of media data. Each of media data boxes 404 may include one or more samples 405. Each of samples 405 may comprise an audio or video access unit. Each access unit may comprise multiple coded pictures in multi-view coding (e.g., MV-HEVC and 3D-HEVC) and scalable video coding (e.g., SHVC). For instance, an access unit may include one or more coded pictures for each layer.

Furthermore, in the example of FIG. 6, movie box 402 includes a track box 406. Track box 406 may enclose metadata for a track of file 400. In other examples, movie box 402 may include multiple track boxes for different tracks of file 400. Track box 406 includes a track reference box 408 and a media box 410. Track reference box 408 may include a track reference type box 409. Track reference type box 409 may be associated with a type (e.g., 'tbas') and a track identifier identifying another track. In accordance with the sixth technique of this disclosure, track reference boxes of tile tracks may or may not include track reference type boxes associated with the type identifier 'tbas'.

Media box 410 may contain all objects that declare information about the media data within the track. Media box 410 includes a media information box 412. Media information box 412 may contain all objects that declare characteristic information of the media of the track. Media information box 412 includes a sample table box 414. Sample table box 414 may specify sample-specific metadata.

In the example of FIG. 6, sample table box 414 includes a SampleToGroup box 416, a SampleGroupDescription box 418, and a SampleGroupDescription box 420. In other examples, sample table box 414 may include other boxes in addition to SampleToGroup box 416, SampleGroupDescription box 418, and SampleGroupDescription box 420. SampleToGroup box 416 may map samples (e.g., particular ones of samples 405) to a group of samples described in a SampleGroupDescription box, such as SampleGroupDescription box 418 or SampleGroupDescription box 420. Each of SampleGroupDescription box 418, 420 may specify properties shared by the samples in various groups of samples (i.e., sample groups).

Furthermore, in the example of FIG. 6, SampleGroupDescription box 418 includes one or more tile region sample entries 422. SampleGroupDescription box 420 includes one or more NALU map entries 424. In accordance with the second technique of this disclosure, when tile region sample entries 422 are associated with SampleToGroup box 416, there shall be only one tile region (either one tile region or a set of tile regions that are grouped together to form a bigger region) present in a sample (e.g., any of samples 405). In accordance with the third technique of this disclosure, a version field of SampleGroupDescription box 418 may indicate whether mapping of tile regions and samples 405 uses a NALU map entry (e.g., NALU map entry 424) or directly uses SampleToGroup box 416.

Figure 7:
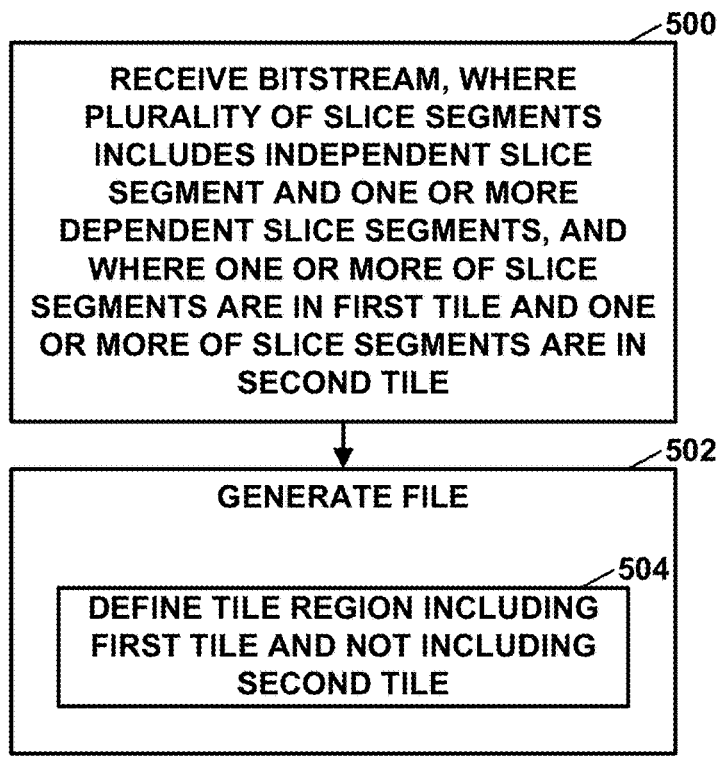
FIG. 7 is a flowchart illustrating an example operation of a computing device in accordance with a technique of this disclosure.

FIG. 7 is a flowchart illustrating an example operation of a computing device in accordance with a technique of this disclosure. The flowcharts of the disclosure are examples. Other examples may include more, fewer, or different actions. In the example of FIG. 7, the computing device may be various types of computing devices, including source device 12 (FIG. 1), file generation device 34 (FIG. 1), post-processing entity 127 (FIG. 3), server device 302 (FIG. 5), transcoding device 306 (FIG. 5), or another device.

In the example of FIG. 7, the computing device receives a bitstream comprising a stream of NAL units (500). The computing device may receive the bitstream in various ways. For example, the computing device may receive the bitstream from a data storage medium, from a network interface, or in another manner. The stream of NAL units comprises a plurality of coded slice NAL units. Each respective coded slice NAL unit of the plurality of coded slice NAL units encapsulates a respective RBSP for a respective slice segment of a plurality of slice segments of a slice of a picture of the video data. Each respective slice segment of the plurality of slice segments of the slice comprises an integer number of CTUs of the picture. The plurality of slice segments of the slice includes an independent slice segment and one or more dependent slice segments. No values of syntax elements in a slice segment header of the independent slice segment are inferred from values for any preceding slice segment.

Furthermore, for each respective dependent slice segment of the one or more dependent slice segments, the respective dependent slice segment has values of one or more syntax elements of a slice segment header of the respective dependent slice segment inferred from values for the independent slice segment. Additionally, the picture is partitioned into a plurality of tiles (e.g., HEVC tiles), including a first tile and a second tile. The plurality of slice segments of the slice includes one or more slice segments that contain CTUs of the first tile and the plurality of slice segments of the slice includes one or more slice segments that contain CTUs of the second tile.

In the example of FIG. 7, the computing device generates a file storing the bitstream (502). For example, the computing device may store data representing the file on a computer-readable storage medium. As part of generating the file, the computing device defines a tile region in the file (504). In the example of FIG. 7, the tile region may be a rectangular tile region that comprises an integer number of tiles of the plurality of tiles forming a rectangular region encoded in one or more of the slice segments. In some examples, the rectangular tile region does not contain any tile other than the integer number of tiles forming the rectangular region. Furthermore, the rectangular tile region includes the first tile, but the rectangular tile region does not include the second tile.

In some examples, the computing device may define, in the file, an unconstrained tile region that comprises one or more slice segments of the plurality of slice segments. Each of the one or more slice segments of the unconstrained tile region consists of one or more complete tiles of the plurality of tiles. The one or more complete tiles include the first tile and not the second tile. The computing device may define the unconstrained tile region using an unconstrained tile region sample entry.

In some examples, to define the tile region in the file, the computing device may generate in the file a tile region sample entry in a SampleToGroup box in the file. Syntax elements (e.g., horizontal_offset, vertical_offset, region_width, region_height) in the tile region sample entry may specify the tile region. Additionally, the computing device may generate in the file a NALU map entry associated with the tile region sample entry. As described elsewhere in this disclosure, the NALU map entry specifies NAL units associated with the tile region.

Furthermore, in accordance with the second technique of this disclosure, as part of generating the file in action (502), the computing device may generate a sample in the file. For instance, the computing device may store data defining a sample box in the file. The sample comprises the plurality of coded slice NAL units. Additionally, the computing device may generate, in the file, a SampleToGroup box and a SampleGroupDescription box. The SampleGroupDescription box contains a tile region sample entry associated with the SampleToGroup box. An entry in the SampleToGroup box maps the sample to the tile region sample entry. The tile region sample entry in the SampleGroupDescription box describes the tile region. Furthermore, based on the file including the tile region sample entry associated with the SampleToGroup box, a constraint in a file format of the file prevents the computing device from defining any additional tile region that includes CTUs in the sample. Thus, the file complies with the provision that when tile region sample entries are associated with a SampleToGroup box, there shall be only one tile region (either one tile region or a set of tile regions that are grouped together to form a bigger region) present in a sample.

In accordance with the third technique of this disclosure, as part of generating the file in action (500), the computing device may generate a sample in the file. The sample comprises the plurality of coded slice NAL units. Additionally, as part of generating the file, the computing device may generate a sample group description box in the file. As part of generating the sample group description box, the computing device may generate a tile region sample entry in the sample group description box. Additionally, as part of generating the sample group description box, the computing device may set a version syntax element of the sample group description box such that the version syntax element of the sample group description box indicates which of the following the tile region sample entry is associated with: a NAL unit map entry or a SampleToGroup box. Thus, the version field of the sample group description box ('sgpd') that contains the tile region sample entry can be used to indicate whether the tile regions sample entries may be associated with NALU map entry or sample to group box. For instance, the version syntax element being equal to 0 may indicate the tile region sample entry is associated with the SampleToGroup box and not the NAL unit map entry; the version syntax element being equal to 1 may indicate the tile region sample entry is associated with the NAL unit map entry and not the SampleToGroup box.

Figure 8:
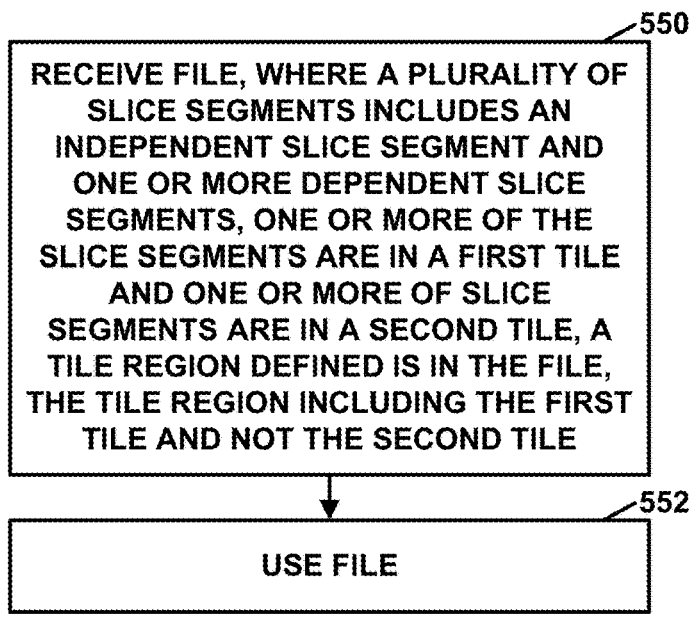
FIG. 8 is a flowchart illustrating an example operation of a computing device for processing a file, in accordance with a technique of this disclosure.

FIG. 8 is a flowchart illustrating an example operation of a computing device for processing a file, in accordance with a technique of this disclosure. The operation of FIG. 8 may be performed by various types of computing devices. For example, the operation of FIG. 8 may be performed by destination device 14 (FIG. 1), network entity 229 (FIG. 4), server device 302 (FIG. 5), transcoding device 306 (FIG. 5), client device 308 (FIG. 5), or another device.

In the example of FIG. 8, the computing device receives a file that stores a bitstream (550). The computing device may receive the file in various ways. For example, the computing device may receive the file from a computer-readable storage medium, from a network interface, or from another source.

The bitstream comprises a stream of NAL units. The stream of NAL units in the bitstream comprises a plurality of coded slice NAL units. Each respective coded slice NAL unit of the plurality of coded slice NAL units encapsulates a respective RBSP for a respective slice segment of a plurality of slice segments of a slice of a picture of the video data. Each respective slice segment of the plurality of slice segments of the slice comprises an integer number of CTUs of the picture. The plurality of slice segments of the slice includes an independent slice segment and one or more dependent slice segments. No values of syntax elements in a slice segment header of the independent slice segment are inferable (e.g., by video decoder 30) from values for any preceding slice segment. For each respective dependent slice segment of the one or more dependent slice segments, the respective dependent slice segment has values of one or more syntax elements of a slice segment header of the respective dependent slice segment inferable (e.g., by video decoder 30) from values for the independent slice segment. The picture is partitioned into a plurality of tiles (e.g., HEVC tiles). The plurality of tiles includes a first tile and a second tile. The plurality of slice segments of the slice includes one or more slice segments that contain CTUs of the first tile and the plurality of slice segments of the slice includes one or more slice segments that contain CTUs of the second tile.

A tile region is defined in the file. The tile region is a rectangular tile region that comprises an integer number of tiles of the plurality of tiles forming a rectangular region encoded in one or more of the slice segments. A region may be encoded one or more slice segments when the slice segments include encoded blocks of the region. In some examples, the rectangular tile region does not contain any tile other than the integer number of tiles forming the rectangular region. The rectangular tile region includes the first tile, but the rectangular tile region does not include the second tile.

In some examples, an unconstrained tile region is defined in the file. The unconstrained tile region comprises one or more slice segments of the plurality of slice segments. Each of the one or more slice segments of the unconstrained tile region comprises or consists of one or more complete tiles of the plurality of tiles. The one or more complete tiles include the first tile. The one or more complete tiles do not include the second tile.

Furthermore, in the example of FIG. 8, the computing device may use the file for at least one of: local media file playback or progressive downloading of data in the file to a remote device (552). The computing device may use the file in various ways. For example, the file includes a plurality of track boxes that define a plurality of tracks. In this example, a particular track box of the plurality of track boxes contains a SampleToGroup box that contains a tile region sample entry. In this example, the tile region sample entry comprises syntax elements (e.g., horizontal_offset, vertical_offset, region_width, vertical_height) defining the tile region. Furthermore, in this example, as part of using the file, the computing device may determine, based on the syntax elements in the tile region sample entry, that the particular track is associated with the tile region. For instance, based on values of the syntax elements in the tile region sample entry matching corresponding values of a desired tile region, the computing device may determine that the tile region sample entry (and hence the track containing the SampleToGroup box containing the tile region sample entry) corresponds to the desired tile region. In this example, based on the determination that the particular track is associated with the tile region, the computing device may extract samples of the particular track from the file without extracting samples of one or more other tracks of the plurality of tracks from the file. The extracted samples of the particular track include NAL units containing encoded blocks in the tile region. Extracting the samples may comprise reading or copying the samples.

Furthermore, in some examples, the computing device may decode the encoded blocks in the extracted samples and not decode encoded blocks in the samples of the one or more other tracks. The computing device may decode the encoded blocks in accordance with the examples provided elsewhere in this disclosure. Additionally or alternatively, the computing device may download, to the remote device, the NAL units in the extracted samples of the particular track and not download to the remote device the NAL units in the samples of the one or more other tracks.

Although not shown in the example of FIG. 8, the computing device may, in accordance with the second example technique of this disclosure and as part of receiving the file, receive, in the file, a sample, a sample-to-group box (e.g., a SampleToGroup box), and a sample group description box (e.g., a SampleGroupDescription box). The sample comprises the plurality of coded slice NAL units. The sample group description box comprises a tile region sample entry describing the tile region. For instance, the sample group description box may include a rectangular tile region sample entry or an unconstrained tile region sample entry. In this example, the tile region is the only tile region defined in the sample. In this example, the computing device may determine, based on an entry in the sample-to-group box that identifies the sample and specifies the tile region sample entry, that the coded slice NAL units in the sample contain CTUs of the tiles in the tile region.

Furthermore, although not shown in the example of FIG. 8, the computing device may, in accordance with the third example technique of this disclosure and as part of receiving the file, receive a sample in the file. The sample comprises the plurality of coded slice NAL units. Additionally, the computing device may receive a sample group description box in the file. As part of receiving the sample group description box, the computing device may receive a tile region sample entry in the sample group description box. In this example, the computing device may determine, based on a version syntax element of the sample group description box, whether the tile region sample entry is associated with a NAL unit map entry or a SampleToGroup box. For instance, the version syntax element being equal to 0 may indicate the tile region sample entry is associated with the SampleToGroup box and not the NAL unit map entry, and the version element being equal to 1 may indicate the tile region sample entry is associated with the NAL unit map entry and not the SampleToGroup box.

In one or more examples, the functions described may be implemented in hardware, software, firmware, or any combination thereof. If implemented in software, the functions may be stored on or transmitted over, as one or more instructions or code, a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transient media, but are instead directed to non-transient, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

Various examples have been described. These and other examples are within the scope of the following claims.

What is claimed is:

1. A method of processing video data, the method comprising:
receiving, by a computing device, a bitstream comprising a stream of Network Abstraction Layer (NAL) units, the stream of NAL units comprising a plurality of coded slice NAL units, each respective coded slice NAL unit of the plurality of coded slice NAL units encapsulating a respective Raw Byte Sequence Payload (RBSP) for a respective slice segment of a plurality of slice segments of a slice of a picture of the video data, each respective slice segment of the plurality of slice segments of the slice comprising an integer number of Coding Tree Units (CTUs) of the picture, the plurality of slice segments of the slice including an independent slice segment and one or more dependent slice segments, wherein:
no values of syntax elements in a slice segment header of the independent slice segment are inferable from values for any preceding slice segment,
for each respective dependent slice segment of the one or more dependent slice segments, the respective dependent slice segment has values of one or more syntax elements of a slice segment header of the respective dependent slice segment inferable from values for the independent slice segment,
the picture is partitioned into a plurality of tiles, the plurality of tiles including a first tile and a second tile, and the plurality of slice segments of the slice includes one or more slice segments that contain CTUs of the first tile and the plurality of slice segments of the slice includes one or more slice segments that contain CTUs of the second tile; and generating, by the computing device, a file storing the bitstream, wherein generating the file comprises defining a tile region in the file, the tile region being a rectangular tile region that comprises an integer number of tiles of the plurality of tiles forming a rectangular region encoded in one or more of the slice segments, the rectangular tile region including the first tile, the rectangular tile region not including the second tile.

2. The method of claim 1, further comprising:
defining, in the file, an unconstrained tile region that comprises one or more slice segments of the plurality of slice segments, each of the one or more slice segments of the unconstrained tile region consisting of one or more complete tiles of the plurality of tiles, the one or more complete tiles including the first tile, the one or more complete tiles not including the second tile.

3. The method of claim 1, wherein generating the file further comprises:
generating, by the computing device, a sample in the file, the sample comprising the plurality of coded slice NAL units; and
generating, by the computing device, in the file, a sample-to-group box and a sample group description box, the sample group description box containing a tile region sample entry associated with the sample-to-group box, an entry in the sample-to-group box mapping the sample to the tile region sample entry, the tile region sample entry in the sample group description box describing the tile region,
wherein, based on the file including the tile region sample entry associated with the sample-to-group box, a constraint in a file format of the file prevents the computing device from defining any additional tile region that includes CTUs in the sample.

4. The method of claim 1, wherein:
generating the file further comprises:
generating a sample in the file, the sample comprising the plurality of coded slice NAL units; and
generating a sample group description box in the file, wherein generating the sample group description box comprises:
generating a tile region sample entry in the sample group description box; and
setting a version syntax element of the sample group description box such that the version syntax element of the sample group description box indicates which of the following the tile region sample entry is associated with: a NAL unit map entry or a SampleToGroup box.

5. The method of claim 4, wherein:
the version element being equal to 0 indicates the tile region sample entry is associated with the SampleToGroup box and not the NAL unit map entry, and
the version element being equal to 1 indicates the tile region sample entry is associated with the NAL unit map entry and not the SampleToGroup box.

6. A method of processing video data, the method comprising:
receiving, by a computing device, a file that stores a bitstream, the bitstream comprising a stream of Network Abstraction Layer (NAL) units, the stream of NAL units comprising a plurality of coded slice NAL units, each respective coded slice NAL unit of the plurality of coded slice NAL units encapsulating a respective Raw Byte Sequence Payload (RBSP) for a respective slice segment of a plurality of slice segments of a slice of a picture of the video data, each respective slice segment of the plurality of slice segments of the slice comprising an integer number of Coding Tree Units (CTUs) of the picture, the plurality of slice segments of the slice including an independent slice segment and one or more dependent slice segments, wherein:
no values of syntax elements in a slice segment header of the independent slice segment are inferable from values for any preceding slice segment,
for each respective dependent slice segment of the one or more dependent slice segments, the respective dependent slice segment has values of one or more syntax elements of a slice segment header of the respective dependent slice segment inferable from values for the independent slice segment,
the picture is partitioned into a plurality of tiles, the plurality of tiles including a first tile and a second tile, and
the plurality of slice segments of the slice includes one or more slice segments that contain CTUs of the first tile and the plurality of slice segments of the slice includes one or more slice segments that contain CTUs of the second tile, and
a tile region is defined in the file, the tile region being a rectangular tile region that comprises an integer number of tiles of the plurality of tiles forming a rectangular region encoded in one or more of the slice segments, the rectangular tile region including the first tile, the rectangular tile region not including the second tile; and
using, by the computing device, the file for at least one of: local media file playback or progressive downloading of data in the file to a remote device.

7. The method of claim 6,
wherein the file includes a plurality of track boxes that define a plurality of tracks, a particular track box of the plurality of track boxes containing a SampleToGroup box that contains a tile region sample entry, the tile region sample entry comprising syntax elements defining the tile region, and
wherein using the file comprises:
determining, based on the syntax element in the tile region sample entry, that the particular track is associated with the tile region; and
based on the determination that the particular track is associated with the tile region, extracting samples of the particular track from the file without extracting samples of one or more other tracks of the plurality of tracks from the file, the extracted samples of the particular track including NAL units containing encoded blocks in the tile region.

8. The method of claim 7, further comprising at least one of:
decoding the encoded blocks in the extracted samples and not decoding encoded blocks in the samples of the one or more other tracks, or
downloading, to the remote device, the NAL units in the extracted samples of the particular track and not downloading to the remote device the NAL units in the samples of the one or more other tracks.

9. The method of claim 6, wherein an unconstrained tile region is defined in the file, the unconstrained tile region comprising one or more slice segments of the plurality of slice segments, each of the one or more slice segments of the unconstrained tile region consisting of one or more complete tiles of the plurality of tiles, the one or more complete tiles including the first tile, the one or more complete tiles not including the second tile.

10. The method of claim 6, wherein:
receiving the file further comprises receiving, by the computing device, in the file, a sample, a sample-to-group box, and a sample group description box, the sample comprising the plurality of coded slice NAL units, the sample group description box comprising a tile region sample entry describing the tile region,
the tile region is the only tile region defined in the sample, and
the method further comprises determining, by the computing device, based on an entry in the sample-to-group box that identifies the sample and specifies the tile region sample entry, that the coded slice NAL units in the sample contain CTUs of the tiles in the tile region.

11. The method of claim 6, wherein:
receiving the file further comprises:
receiving, by the computing device, a sample in the file, the sample comprising the plurality of coded slice NAL units; and
receiving, by the computing device, a sample group description box in the file, wherein receiving the sample group description box comprises receiving, by the computing device, a tile region sample entry in the sample group description box, and
the method further comprises determining, by the computing device, based on a version syntax element of the sample group description box, whether the tile region sample entry is associated with a NAL unit map entry or a SampleToGroup box.

12. The method of claim 11, wherein:
the version syntax element being equal to 0 indicates the tile region sample entry is associated with the SampleToGroup box and not the NAL unit map entry, and
the version syntax element being equal to 1 indicates the tile region sample entry is associated with the NAL unit map entry and not the SampleToGroup box.

13. A computing device for generating a file for storage of video data, the computing device comprising:
a memory configured to store the file; and
one or more processors configured to:
receive a bitstream comprising a stream of Network Abstraction Layer (NAL) units, the stream of NAL units comprising a plurality of coded slice NAL units, each respective coded slice NAL unit of the plurality of coded slice NAL units encapsulating a respective Raw Byte Sequence Payload (RBSP) for a respective slice segment of a plurality of slice segments of a slice of a picture of the video data, each respective slice segment of the plurality of slice segments of the slice comprising an integer number of Coding Tree Units (CTUs) of the picture, the plurality of slice segments of the slice including an independent slice segment and one or more dependent slice segments, wherein:
no values of syntax elements in a slice segment header of the independent slice segment are inferable from values for any preceding slice segment, for each respective dependent slice segment of the one or more dependent slice segments, the respective dependent slice segment has values of one or more syntax elements of a slice segment header of the respective dependent slice segment inferable from values for the independent slice segment,
the picture is partitioned into a plurality of tiles, the plurality of tiles including a first tile and a second tile, and
the plurality of slice segments of the slice includes one or more slice segments that contain CTUs of the first tile and the plurality of slice segments of the slice includes one or more slice segments that contain CTUs of the second tile; and
generate a file storing the bitstream, wherein generating the file comprises defining a tile region in the file, the tile region being a rectangular tile region that comprises an integer number of tiles of the plurality of tiles forming a rectangular region encoded in one or more of the slice segments, the rectangular tile region including the first tile, the rectangular tile region not including the second tile.

14. The computing device of claim 13, wherein the one or more processors are further configured to:
define, in the file, an unconstrained tile region that comprises one or more slice segments of the plurality of slice segments, each of the one or more slice segments of the unconstrained tile region consisting of one or more complete tiles of the plurality of tiles, the one or more complete tiles including the first tile, the one or more complete tiles not including the second tile.

15. The computing device of claim 13, wherein the one or more processors are configured such that, as part of generating the file, the one or more processors:
generate a sample in the file, the sample comprising the plurality of coded slice NAL units; and
generate, in the file, a sample-to-group box and a sample group description box, the sample group description box containing a tile region sample entry associated with the sample-to-group box, an entry in the sample-to-group box mapping the sample to the tile region sample entry, the tile region sample entry in the sample group description box describing the tile region,
wherein, based on the file including the tile region sample entry associated with the sample-to-group box, a constraint in a file format of the file prevents the computing device from defining any additional tile region that includes CTUs in the sample.

16. The computing device of claim 13, wherein:
the one or more processors are configured such that, as part of generating the file, the one or more processors:
generate a sample in the file, the sample comprising the plurality of coded slice NAL units; and
generate a sample group description box in the file, wherein the one or more processors are configured such that, as part of generating the sample group description box, the one or more processors:
generate a tile region sample entry in the sample group description box; and
set a version syntax element of the sample group description box such that the version syntax element of the sample group description box indicates which of the following the tile region sample entry is associated with: a NAL unit map entry or a SampleToGroup box.

17. The computing device of claim 16, wherein:
the version syntax element being equal to 0 indicates the tile region sample entry is associated with the SampleToGroup box and not the NAL unit map entry, and the version syntax element being equal to 1 indicates the tile region sample entry is associated with the NAL unit map entry and not the SampleToGroup box.

18. A computing device for processing a file for storage of video data, the computing device comprising:
a memory configured to store the file; and
one or more processors configured to:
receive a file that stores a bitstream, the bitstream comprising a stream of Network Abstraction Layer (NAL) units, the stream of NAL units comprising a plurality of coded slice NAL units, each respective coded slice NAL unit of the plurality of coded slice NAL units encapsulating a respective Raw Byte Sequence Payload (RBSP) for a respective slice segment of a plurality of slice segments of a slice of a picture of the video data, each respective slice segment of the plurality of slice segments of the slice comprising an integer number of Coding Tree Units (CTUs) of the picture, the plurality of slice segments of the slice including an independent slice segment and one or more dependent slice segments, wherein:
no values of syntax elements in a slice segment header of the independent slice segment are inferable from values for any preceding slice segment,
for each respective dependent slice segment of the one or more dependent slice segments, the respective dependent slice segment has values of one or more syntax elements of a slice segment header of the respective dependent slice segment inferable from values for the independent slice segment,
the picture is partitioned into a plurality of tiles, the plurality of tiles including a first tile and a second tile, and
the plurality of slice segments of the slice includes one or more slice segments that contain CTUs of the first tile and the plurality of slice segments of the slice includes one or more slice segments that contain CTUs of the second tile,
a tile region is defined in the file, the tile region being a rectangular tile region that comprises an integer number of tiles of the plurality of tiles forming a rectangular region encoded in one or more of the slice segments, the rectangular tile region including the first tile, the rectangular tile region not including the second tile; and
use the file for at least one of: local media file playback or progressive downloading of data in the file to a remote device.

19. The computing device of claim 18,
wherein the file includes a plurality of track boxes that define a plurality of tracks, a particular track box of the plurality of track boxes containing a SampleToGroup box that contains a tile region sample entry, the tile region sample entry comprising syntax elements defining the tile region,
wherein the one or more processors are configured such that, as part of using the file, the one or more processors:
determine, based on the syntax element in the tile region sample entry, that the particular track is associated with the tile region; and
based on the determination that the particular track is associated with the tile region, extract samples of the particular track from the file without extracting samples of one or more other tracks of the plurality of tracks from the file, the extracted samples of the particular track including NAL units containing encoded blocks in the tile region.

20. The computing device of claim 19, wherein the one or more processors are further configured to perform at least one of:
decoding the encoded blocks in the extracted samples and not decoding encoded blocks in the samples of the one or more other tracks, or
downloading, to the remote device, the NAL units in the extracted samples of the particular track and not downloading to the remote device the NAL units in the samples of the one or more other tracks.

21. The computing device of claim 18, wherein an unconstrained tile region is defined in the file, the unconstrained tile region comprising one or more slice segments of the plurality of slice segments, each of the one or more slice segments of the unconstrained tile region consisting of one or more complete tiles of the plurality of tiles, the one or more complete tiles including the first tile, the one or more complete tiles not including the second tile.

22. The computing device of claim 18, wherein:
the one or more processors are configured such that, as part of receiving the file, the one or more processors receive, in the file, a sample, a sample-to-group box, and a sample group description box, the sample comprising the plurality of coded slice NAL units, the sample group description box comprising a tile region sample entry describing the tile region,
the tile region is the only tile region defined in the sample, and
the one or more processors are further configured to determine, based on an entry in the sample-to-group box that identifies the sample and specifies the tile region sample entry, that the coded slice NAL units in the sample contain CTUs of the tiles in the tile region.

23. The computing device of claim 18, wherein:
the one or more processors are configured such that, as part of receiving the file, the one or more processors:
receive a sample in the file, the sample comprising the plurality of coded slice NAL units; and
receive a sample group description box in the file, wherein receiving the sample group description box comprises receiving, by the computing device, a tile region sample entry in the sample group description box, and
the one or more processors are further configured to determine, based on a version syntax element of the sample group description box, whether the tile region sample entry is associated with a NAL unit map entry or a SampleToGroup box.

24. The computing device of claim 23, wherein:
the version syntax element being equal to 0 indicates the tile region sample entry is associated with the SampleToGroup box and not the NAL unit map entry, and
the version syntax element being equal to 1 indicates the tile region sample entry is associated with the NAL unit map entry and not the SampleToGroup box.

25. An apparatus for generating a file for storage of video data, the apparatus comprising:
means for receiving a bitstream comprising a stream of Network Abstraction Layer (NAL) units, the stream of NAL units comprising a plurality of coded slice NAL units, each respective coded slice NAL unit of the plurality of coded slice NAL units encapsulating a respective Raw Byte Sequence Payload (RBSP) for a respective slice segment of a plurality of slice segments of a slice of a picture of the video data, each respective slice segment of the plurality of slice segments of the slice comprising an integer number of Coding Tree Units (CTUs) of the picture, the plurality of slice segments of the slice including an independent slice segment and one or more dependent slice segments, wherein:

no values of syntax elements in a slice segment header of the independent slice segment are inferable from values for any preceding slice segment, for each respective dependent slice segment of the one or more dependent slice segments, the respective dependent slice segment has values of one or more syntax elements of a slice segment header of the respective dependent slice segment inferable from values for the independent slice segment, the picture is partitioned into a plurality of tiles, the plurality of tiles including a first tile and a second tile, and the plurality of slice segments of the slice includes one or more slice segments that contain CTUs of the first tile and the plurality of slice segments of the slice includes one or more slice segments that contain CTUs of the second tile; and means for generating a file storing the bitstream, wherein generating the file comprises defining a tile region in the file, the tile region being a rectangular tile region that comprises an integer number of tiles of the plurality of tiles forming a rectangular region encoded in one or more of the slice segments, the rectangular tile region including the first tile, the rectangular tile region not including the second tile.

26. An apparatus for processing a file for storage of video data, the apparatus comprising:

means for receiving a file that stores a bitstream, the bitstream comprising a stream of Network Abstraction Layer (NAL) units, the stream of NAL units comprising a plurality of coded slice NAL units, each respective coded slice NAL unit of the plurality of coded slice NAL units encapsulating a respective Raw Byte Sequence Payload (RBSP) for a respective slice segment of a plurality of slice segments of a slice of a picture of the video data, each respective slice segment of the plurality of slice segments of the slice comprising an integer number of Coding Tree Units (CTUs) of the picture, the plurality of slice segments of the slice including an independent slice segment and one or more dependent slice segments, wherein:

no values of syntax elements in a slice segment header of the independent slice segment are inferable from values for any preceding slice segment, for each respective dependent slice segment of the one or more dependent slice segments, the respective dependent slice segment has values of one or more syntax elements of a slice segment header of the respective dependent slice segment inferable from values for the independent slice segment, the picture is partitioned into a plurality of tiles, the plurality of tiles including a first tile and a second tile, and the plurality of slice segments of the slice includes one or more slice segments that contain CTUs of the first tile and the plurality of slice segments of the slice includes one or more slice segments that contain CTUs of the second tile, and a tile region is defined in the file, the tile region being a rectangular tile region that comprises an integer number of tiles of the plurality of tiles forming a rectangular region encoded in one or more of the slice segments, the rectangular tile region including the first tile, the rectangular tile region not including the second tile; and means for using the file for at least one of: local media file playback or progressive downloading of data in the file to a remote device.

27. A non-transitory computer-readable storage medium encoded with instructions that, when executed, configure a processor of a device to:

receive a bitstream comprising a stream of Network Abstraction Layer (NAL) units, the stream of NAL units comprising a plurality of coded slice NAL units, each respective coded slice NAL unit of the plurality of coded slice NAL units encapsulating a respective Raw Byte Sequence Payload (RBSP) for a respective slice segment of a plurality of slice segments of a slice of a picture of the video data, each respective slice segment of the plurality of slice segments of the slice comprising an integer number of Coding Tree Units (CTUs) of the picture, the plurality of slice segments of the slice including an independent slice segment and one or more dependent slice segments, wherein:

no values of syntax elements in a slice segment header of the independent slice segment are inferable from values for any preceding slice segment, for each respective dependent slice segment of the one or more dependent slice segments, the respective dependent slice segment has values of one or more syntax elements of a slice segment header of the respective dependent slice segment inferable from values for the independent slice segment, the picture is partitioned into a plurality of tiles, the plurality of tiles including a first tile and a second tile, and the plurality of slice segments of the slice includes one or more slice segments that contain CTUs of the first tile and the plurality of slice segments of the slice includes one or more slice segments that contain CTUs of the second tile; and generate a file storing the bitstream, wherein generating the file comprises defining a tile region in the file, the tile region being a rectangular tile region that comprises an integer number of tiles of the plurality of tiles forming a rectangular region encoded in one or more of the slice segments, the rectangular tile region including the first tile, the rectangular tile region not including the second tile.

28. A non-transitory computer-readable storage medium encoded with instructions that, when executed, configure a processor of a device to:

receive a file that stores a bitstream, the bitstream comprising a stream of Network Abstraction Layer (NAL) units, the stream of NAL units comprising a plurality of coded slice NAL units, each respective coded slice NAL unit of the plurality of coded slice NAL units encapsulating a respective Raw Byte Sequence Payload (RBSP) for a respective slice segment of a plurality of slice segments of a slice of a picture of the video data, each respective slice segment of the plurality of slice segments of the slice comprising an integer number of Coding Tree Units (CTUs) of the picture, the plurality of slice segments of the slice including an independent slice segment and one or more dependent slice segments, wherein:

no values of syntax elements in a slice segment header of the independent slice segment are inferable from values for any preceding slice segment, for each respective dependent slice segment of the one or more dependent slice segments, the respective dependent slice segment has values of one or more syntax elements of a slice segment header of the respective dependent slice segment inferable from values for the independent slice segment, the picture is partitioned into a plurality of tiles, the plurality of tiles including a first tile and a second tile, and the plurality of slice segments of the slice includes one or more slice segments that contain CTUs of the first tile and the plurality of slice segments of the slice includes one or more slice segments that contain CTUs of the second tile, and a tile region is defined in the file, the tile region being a rectangular tile region that comprises an integer number of tiles of the plurality of tiles forming a rectangular region encoded in one or more of the slice segments, the rectangular tile region including the first tile, the rectangular tile region not including the second tile; and use the file for at least one of: local media file playback or progressive downloading of data in the file to a remote device.

\* \* \* \* \*